US009803049B2

(12) United States Patent
Fernandez

(10) Patent No.: US 9,803,049 B2
(45) Date of Patent: Oct. 31, 2017

(54) MELT POLYMERIZATION POLYCARBONATE QUENCHING

(71) Applicant: SABIC Global Technologies B.V., Bergen op Zoom (NL)

(72) Inventor: Ignacio Vic Fernandez, Murica (ES)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/113,548

(22) PCT Filed: Mar. 25, 2015

(86) PCT No.: PCT/IB2015/052216
§ 371 (c)(1),
(2) Date: Jul. 22, 2016

(87) PCT Pub. No.: WO2015/145381
PCT Pub. Date: Oct. 1, 2015

(65) Prior Publication Data
US 2017/0002139 A1   Jan. 5, 2017

(30) Foreign Application Priority Data

Mar. 27, 2014 (EP) .................................... 14382110
Mar. 27, 2014 (EP) .................................... 14382112

(51) Int. Cl.
| | | |
|---|---|---|
| C08G 63/02 | (2006.01) | |
| C08G 64/40 | (2006.01) | |
| C08L 69/00 | (2006.01) | |
| B05D 1/26 | (2006.01) | |
| C08J 3/20 | (2006.01) | |
| C08G 64/00 | (2006.01) | |

(52) U.S. Cl.
CPC ............. *C08G 64/40* (2013.01); *B05D 1/265* (2013.01); *C08J 3/203* (2013.01); *C08L 69/00* (2013.01); *C08J 2369/00* (2013.01)

(58) Field of Classification Search
CPC .................................................... C08G 64/40
USPC .................................................. 528/196, 198
See application file for complete search history.

(56) References Cited

U.S. PATENT DOCUMENTS

| | | | |
|---|---|---|---|
| 5,225,526 A | 7/1993 | Fukawa et al. | |
| 5,514,767 A | 5/1996 | Sakashita et al. | |
| 5,606,007 A | 2/1997 | Sakashita et al. | |
| 5,606,008 A | 2/1997 | Sakashita et al. | |
| 5,719,254 A | 2/1998 | Hachiya et al. | |
| 5,777,064 A | 7/1998 | Hayashi et al. | |
| 5,852,156 A | 12/1998 | Hachiya et al. | |
| 5,973,101 A | 10/1999 | Toshida et al. | |
| 6,090,907 A | 7/2000 | Saito et al. | |
| 6,107,440 A | 8/2000 | Hachiya et al. | |
| 6,117,969 A | 9/2000 | Nanba et al. | |
| 6,124,422 A | 9/2000 | Mestanza | |
| 6,136,945 A | 10/2000 | Mestanza | |
| 6,177,536 B1 | 1/2001 | Anamizu et al. | |
| 6,482,877 B2 | 11/2002 | Inoue et al. | |
| 6,495,654 B1 | 12/2002 | Volkers et al. | |
| 6,504,000 B1 | 1/2003 | Volkers et al. | |
| 6,555,646 B2 | 4/2003 | Volkers et al. | |
| 6,583,258 B1 | 6/2003 | Lemmon et al. | |
| 6,747,080 B2 | 6/2004 | Hachiya et al. | |
| 6,759,504 B1 | 7/2004 | Mestanza | |
| 7,084,233 B2 | 8/2006 | Miyamoto et al. | |
| 7,112,645 B2 | 9/2006 | Abad et al. | |
| 7,183,342 B2 | 2/2007 | Miyamoto et al. | |
| 7,250,483 B2 | 7/2007 | Heuer et al. | |
| 7,271,235 B2 | 9/2007 | Miyamoto et al. | |
| 7,279,544 B2 | 10/2007 | Hucks et al. | |
| 7,307,114 B2 | 12/2007 | Hachiya et al. | |
| 7,309,755 B2 | 12/2007 | Goossens | |
| 7,999,056 B2 | 8/2011 | Uchimura et al. | |
| 2004/0147655 A1 | 7/2004 | Sawaki et al. | |
| 2009/0105393 A1 | 4/2009 | Jansen et al. | |
| 2009/0105444 A1 | 4/2009 | Chatterjee et al. | |
| 2012/0130015 A1* | 5/2012 | Horn ........................ | B29B 7/08 524/611 |

(Continued)

FOREIGN PATENT DOCUMENTS

| | | |
|---|---|---|
| EP | 0995768 A2 | 4/2000 |
| EP | 2174970 A1 | 4/2010 |
| EP | 2540758 A1 | 1/2013 |

(Continued)

OTHER PUBLICATIONS

European Search Report for Application No. 14382110.6, dated Aug. 21, 2014, 5 pages.
International Search Report for International Application No. PCT/IB2015/052216; International Filing Date Mar. 25, 2015; dated Jun. 17, 2015; 4 pages.
PAJ Translation of JP03617578 B2; Date of Publication Feb. 9, 2005; 19 pages.
PAJ Translation of JP03712306 B2; Date of Publication Nov. 2, 2005; 18 pages.
PAJ Translation of JP04290472 B2; Date of Publication Jul. 8, 2009; 19 pages.
PAJ Translation of JP05025841 B2; Date of Publication Feb. 9, 2012; 28 pages.

(Continued)

*Primary Examiner* — Terressa Boykin
(74) *Attorney, Agent, or Firm* — Cantor Colburn LLP

(57) ABSTRACT

In an embodiment, a melt polymerization process comprises melt polymerizing reactants in at least two polymerization units, in the presence of a catalyst composition to form polymerized polycarbonate; adding a quencher composition comprising one or both of a liquid quencher composition and a solid quencher composition; mixing the quencher composition with the polymerized polycarbonate for a period of time of greater than or equal to 5 seconds prior to the addition to the polymerized polycarbonate of any additives having a reactive OH group or reactive ester group; directing the polymerized polycarbonate to an extruder; and directing an additive to the extruder.

17 Claims, 1 Drawing Sheet

(56) References Cited

U.S. PATENT DOCUMENTS

2013/0136889 A1    5/2013  Namba et al.

FOREIGN PATENT DOCUMENTS

| | | | |
|---|---|---|---|
| JP | 2003335853 | A | 11/2003 |
| WO | 2005092951 | A1 | 10/2005 |
| WO | 2009139534 | A1 | 11/2009 |
| WO | 2014033508 | A1 | 3/2014 |
| WO | 2015059611 | A3 | 4/2015 |

OTHER PUBLICATIONS

PAJ Translation of JP2000129141; Date of Publication May 9, 2000; 18 pages.
PAJ Translation of JP2000239544 A; Date of Publication Sep. 5, 2000; 20 pages.
Written Opinion of the International Search Report for International Application No. PCT/IB2015/052216; International Filing Date Mar. 25, 2015; dated Jun. 17, 2015; 5 pages.

* cited by examiner

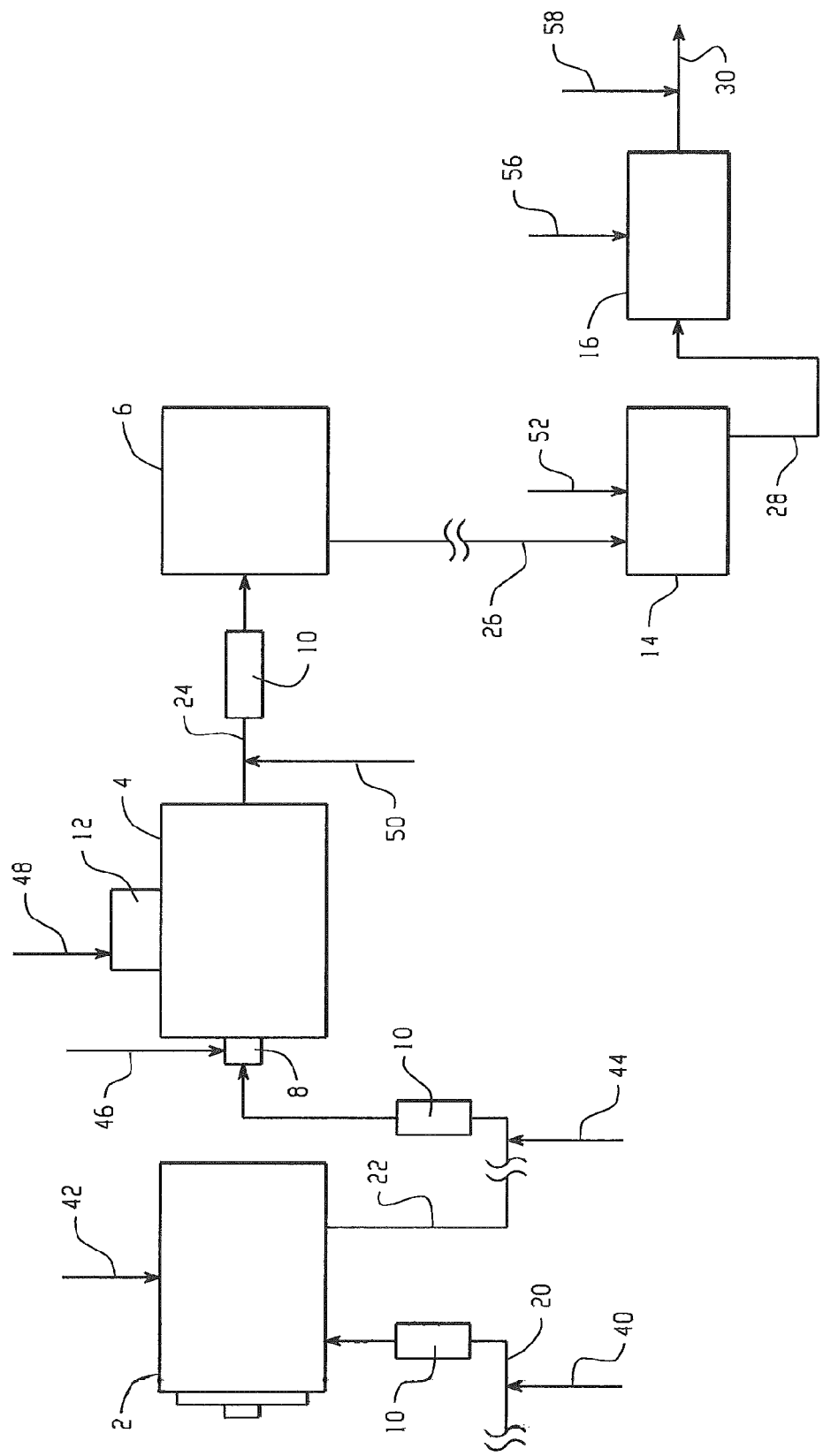

MELT POLYMERIZATION POLYCARBONATE QUENCHING

CROSS REFERENCE TO RELATED APPLICATIONS

This application is a National Stage application of PCT/IB2015/052216, filed Mar. 25, 2015, which claims the benefit of EP Application No. 14382110.6, filed Mar. 27, 2014; and EP Application No. 14382112.2 filed on Mar. 27, 2014, all of which are incorporated by reference in their entirety herein.

TECHNICAL FIELD

This application relates to quenching and quenchers in a melt polymerization processes.

BACKGROUND

Polycarbonates are used in a wide variety of fields due to their excellent mechanical properties such as impact resistance as well as in heat resistance and transparency. Polycarbonates can be made by melt polymerizing a dihydroxy compound and a carbonate compound in the presence of a catalyst and a quencher can be subsequently added to reduce the activity of the catalyst in the polycarbonate. If the catalyst is unquenched in the polycarbonate composition, it can disadvantageously lead to poor color, reduced molecular weight, or poor rheological properties. Furthermore, residual catalyst in the polycarbonate composition can also interact with additives, detracting from their efficacy.

Improved methods of adding the quencher are desired, for example, that result in an article with an improved yellowness index.

BRIEF DESCRIPTION

Disclosed herein are methods for adding a quencher.

In an embodiment, a melt polymerization process comprises melt polymerizing reactants in at least two polymerization units, in the presence of a catalyst composition to form polymerized polycarbonate, wherein the catalyst composition comprises an alpha catalyst; adding a quencher composition comprising one or both of a liquid quencher composition and a solid quencher composition by a method comprising one or both of combining a liquid carrier and the quencher in a quencher vessel to form the liquid quencher composition or melting the quencher in the quencher vessel to form the liquid quencher composition, and adding the liquid quencher composition to the polymerized polycarbonate at a pressure of greater than or equal to 2 bars or greater than or equal to 3 bars; and adding the solid quencher composition comprising the quencher to the polymerized polycarbonate in an extruder; mixing the quencher composition with the polymerized polycarbonate for a period of time of greater than or equal to 5 seconds prior to the addition to the polymerized polycarbonate of any additives having a reactive OH group or reactive ester group; filtering the polymerized polycarbonate; directing the polymerized polycarbonate to an extruder; directing an anthraquinone colorant, a phenolic antioxidant, a UV absorber, a release agent, a flame retardant, or a combination comprising one or more of the foregoing to the extruder; and adding an anti-drip agent.

The above described and other features are exemplified by the following FIGURE and detailed description.

BRIEF DESCRIPTION OF THE DRAWINGS

Refer now to the FIGURES, which are exemplary embodiments, and wherein the like elements are numbered alike.

FIG. 1 illustrates a process of adding a quencher composition.

DETAILED DESCRIPTION

In the melt polymerization of polycarbonate, the presence of a catalyst in a polymerized polycarbonate can disadvantageously lead to poor color, reduced molecular weight, or poor rheological properties. Furthermore, residual catalyst in the polymerized polycarbonate can also interact with additives, detracting from their efficacy. In order to reduce the activity of the catalyst in a polymerized polycarbonate after polymerization, a quencher can be added. It was surprisingly found that if an additive with a reactive group with respect to the polycarbonate was added prior to adding the quencher or within 5 seconds of adding the additive with the reactive group then an increased yellowing of the polycarbonate product would occur.

A process of adding a quencher, for example, comprising one or both of a liquid quencher and a solid quencher to a melt polycarbonate polymerization was therefore discovered. For example, a process of adding a liquid quencher can comprise combining a liquid carrier and the quencher in a quencher vessel to form the liquid quencher composition or melting the quencher in the quencher vessel to form the liquid quencher composition, and adding the liquid quencher composition to the polymerized polycarbonate at a pressure of greater than or equal to 2 bars or greater than or equal to 3 bars; and a process of adding the solid quencher composition can comprise the quencher to the polymerized polycarbonate in an extruder. The quencher composition can be mixed with the polymerized polycarbonate for a period of time of greater than or equal to 5 seconds prior to the addition to the polymerized polycarbonate of any additives having a reactive OH group or reactive ester group.

"Polycarbonate" as used herein means a polymer having repeating structural carbonate units of formula (1)

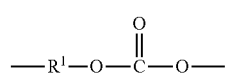

in which at least 60 percent of the total number of $R^1$ groups contain aromatic moieties and the balance thereof are aliphatic, alicyclic, or aromatic. Each $R^1$ can be a $C_{6-30}$ aromatic group, that is, contains at least one aromatic moiety. $R^1$ can be derived from an aromatic dihydroxy compound of the formula HO—$R^1$—OH, in particular of formula (2): HO-$A^1$-$Y^1$-$A^2$-OH, wherein each of $A^1$ and $A^2$ is a monocyclic divalent aromatic group and $Y^1$ is a single bond or a bridging group having one or more atoms that separate $A^1$ from $A^2$. One atom can separate $A^1$ from $A^2$. Specifically, each $R^1$ can be derived from a bisphenol of formula (3)

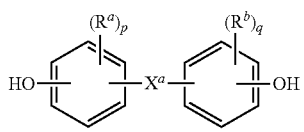

wherein $R^a$ and $R^b$ are each independently a halogen, $C_{1-12}$ alkoxy, or $C_{1-12}$ alkyl; and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. Each p and q can be 1, and $R^a$ and $R^b$ can each be a $C_{1-3}$ alkyl group, specifically methyl, disposed meta to the hydroxy group on each arylene group.

$X^a$ can be a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

$X^a$ can be a $C_{1-18}$ alkylene, a $C_{3-18}$ cycloalkylene, a fused $C_{6-18}$ cycloalkylene, or a group of the formula —B$^1$-G-B$^2$— wherein B$^1$ and B$^2$ are the same or different $C_{1-6}$ alkylene and G is a $C_{3-12}$ cycloalkylidene or a $C_{6-16}$ arylene. For example, $X^a$ can be a substituted $C_{3-18}$ cycloalkylidene of formula (4)

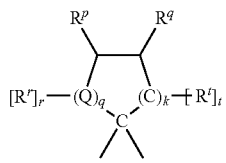

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. Two adjacent groups (e.g., $R^q$ and $R^t$ taken together) can form an aromatic group, and $R^q$ and $R^t$ taken together can form one aromatic group and $R^r$ and $R^p$ taken together can form a second aromatic group. When $R^q$ and $R^t$ taken together form an aromatic group, $R^p$ can be a double-bonded oxygen atom, i.e., a ketone.

Bisphenols wherein $X^a$ is a cycloalkylidene of formula (4) can be used in the manufacture of polycarbonates containing phthalimidine carbonate units of formula (1a)

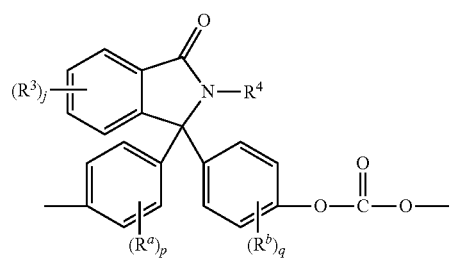

wherein $R^a$, $R^b$, p, and q are as in formula (3), $R^3$ is each independently a $C_{1-6}$ alkyl, j is 0 to 4, and $R_4$ is hydrogen, $C_{1-6}$ alkyl, or a substituted or unsubstituted phenyl, for example a phenyl substituted with up to five $C_{1-6}$ alkyls. For example, the phthalimidine carbonate units are of formula (1b)

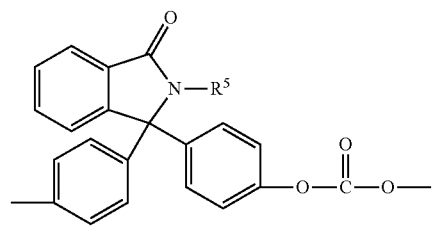

wherein $R^5$ is hydrogen, phenyl optionally substituted with up to five 5 $C_{1-6}$ alkyls, or $C_{1-4}$ alkyl. In formula (1b), $R^5$ can be hydrogen, methyl, or phenyl, specifically phenyl. Carbonate units (1b) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (1c) and (1d)

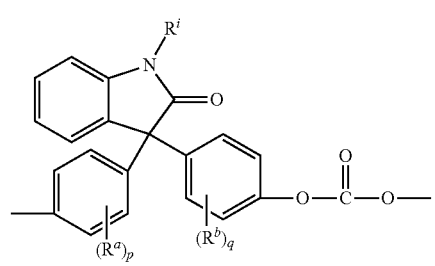

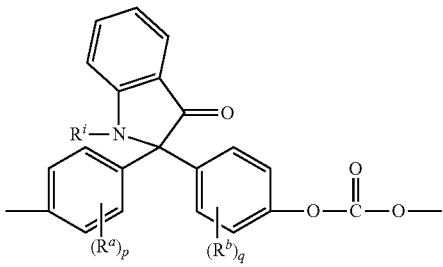

wherein $R^a$ and $R^b$ are each independently $C_{1-12}$ alkyl, p and q are each independently 0 to 4, and $R^i$ is $C_{1-12}$ alkyl, phenyl, optionally substituted with 1 to 5 $C_{1-10}$ alkyl, or benzyl optionally substituted with 1 to 5 $C_{1-10}$ alkyl. Each $R^a$ and $R^b$ can be methyl, p and q can each independently be 0 or 1, and $R^i$ $C_{1-4}$ alkyl or phenyl.

Other examples of bisphenol carbonate units derived from bisphenols (3) wherein $X^a$ is a substituted or unsubstituted $C_{3-18}$ cycloalkylidene (4) include the cyclohexylidene-bridged, alkyl-substituted bisphenol of formula (1e)

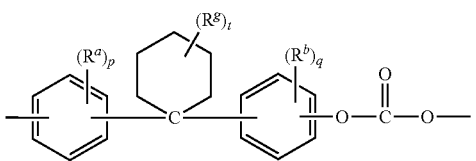

wherein $R^a$ and $R^b$ are each independently $C_{1-12}$ alkyl, $R^g$ is $C_{1-12}$ alkyl, p and q are each independently 0 to 4, and t is 0 to 10. At least one of each of $R^a$ and $R^b$ can be disposed meta to the cyclohexylidene bridging group. Each $R^a$ and $R^b$ can independently be $C_{1-4}$ alkyl, $R^g$ is $C_{1-4}$ alkyl, p and q are each 0 or 1, and t is 0 to 5. $R^a$, $R^b$, and $R^g$ can each be methyl, p and q can each be 0 or 1, and t can be 0 or 3, specifically 0.

Examples of other bisphenol carbonate units derived from bisphenol (3) wherein $X^a$ is a substituted or unsubstituted $C_{3-18}$ cycloalkylidene include adamantyl units of formula (1f) and fluorenyl units of formula (1g)

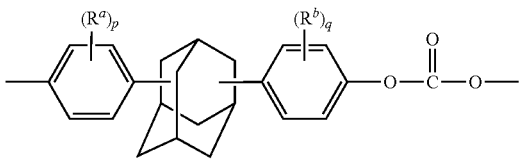

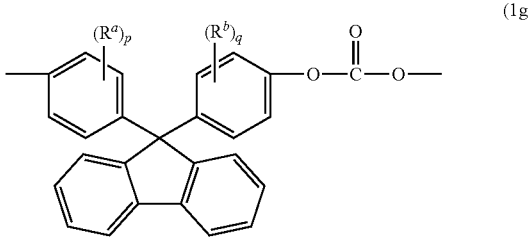

wherein $R^a$ and $R^b$ are each independently $C_{1-12}$ alkyl, and p and q are each independently 1 to 4. At least one of each of $R^a$ and $R^b$ can be disposed meta to the cycloalkylidene bridging group. $R^a$ and $R^b$ can each be independently $C_{1-3}$ alkyl, and p and q can be each 0 or 1; specifically, $R^a$, $R^b$ can each be methyl, p and q are each 0 or 1, and when p and q are 1, the methyl group can be disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula HO—$R^1$—OH include aromatic dihydroxy compounds of formula (6)

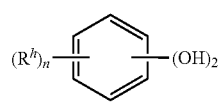

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. The polycarbonate can be a linear homopolymer derived from bisphenol A, in which each of $A^1$ and $A^2$ is p-phenylene and $Y^1$ is isopropylidene in formula (3).

The polycarbonate herein is prepared via the melt polymerization of a bisphenol and a carbonate precursor. Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on each aryl, such as bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

The present polymerization can occur in the presence of a branching agent. Examples of branching agents include polyfunctional organic compounds containing at least three functional groups selected from hydroxyl, carboxyl, carboxylic anhydride, haloformyl, and mixtures of the foregoing functional groups. Such branching agents include aromatic triacyl halides, for example triacyl chlorides of formula (20), wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3; a tri-substituted phenol of formula (21), wherein T is a $C_{1-20}$ alkyl, $C_{1-20}$ alkoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, s is 0 to 4.

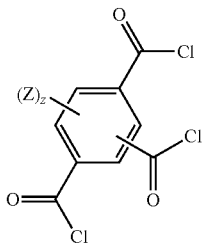

(20)

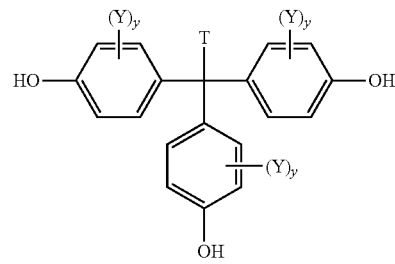

(21)

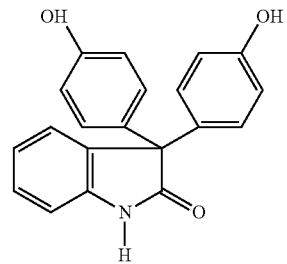

(22)

Examples of branching agents include trimellitic acid, trimellitic anhydride, trimellitic trichloride, tris-p-hydroxyphenylethane, isatin-bis-phenol of formula (22), tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid.

The branching agent can be present in an amount of 0.03 to 0.2 mol % based on the total moles of repeat units in the polycarbonate. The branching agent can be present in an amount of 0.01 to 0.6 mol % based on the total moles of repeat units in the polycarbonate.

In the melt polymerization process, the polycarbonate can be prepared by co-reacting, in a molten state, a dihydroxy reactant and a carbonate precursor in the presence of a transesterification catalyst. The reaction can be carried out in typical polymerization equipment, such as a continuously stirred reactor (CSTR), plug flow reactor, wire wetting fall polymerizers, free fall polymerizers, horizontal polymerizers, wiped film polymerizers, BANBURY mixers, single or twin screw extruders, or a combination comprising one or more of the foregoing. Volatile monohydric phenol is removed from the molten reactants by distillation and the polymer is isolated as a molten residue. Melt polymerization can be conducted as a batch process or as a continuous process. In either case, the melt polymerization conditions used can comprise two or more distinct reaction stages. For example, the polymerization can comprise a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. The first reaction stage can comprise 1 or more, specifically, 2 or more, more specifically, 2 to 4 first stage polymerization units (for example 2 to 4 continuously stirred tanks). When 2 or more first stage polymerization units are present in series, one or both of an increase in temperature or a decrease in pressure can occur from one unit to the next. The second reaction stage can comprise 1 or more, specifically, 2 or more, more specifically, 2 second stage polymerization units (for example 2 horizontal or wire wetting fall polymerizers). When the second reaction stage comprises 2 second stage polymerization units, the first-second stage polymerization unit can polymerize the polycarbonate to a molecular weight of, for example, 20,000 to 50,000 Daltons, the polycarbonate can then be optionally quenched, and a second-second stage polymerization unit can function as a devolitalization unit, where the molecular weight of the polycarbonate does not significantly increase (for example, the molecular weight does not increase by greater than 10 weight percent (wt %)) and a temperature, a pressure, and a residence time are used to reduce the concentration of low molecular weight components (such as those with a molecular weight of less than 1,000 Daltons). The first stage polymerization unit is herein defined as a polymerization unit that results in polycarbonates oligomers with a number average molecular weight of less than or equal to 8,000 Daltons and a second stage polymerization unit is herein defined as a polymerization unit that produces polycarbonate with a number average molecular weight of greater than 8,000 Daltons. It is noted that while less than or equal to 8,000 Daltons is used here to define a molecular weight achieved in the first stage, one skilled in the art readily understands that said molecular weight is used to define an oligomerization stage, where the oligomer molecular weight could be greater than 8,000 Daltons. A "staged" polymerization reaction condition can be used in continuous polymerization systems, wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of 1,000 to 7,500 Daltons. In one or more subsequent polymerization stages the number average molecular weight (Mn) of the polycarbonate can be increased to, for example, 8,000 and 25,000 Daltons (using polycarbonate standard), specifically, 13,000 to 18,000 Daltons.

Typically, solvents are not used in the process, and the reactants dihydroxy aromatic compound and the diaryl carbonate are in a molten state. The reaction temperature can be 100 to 350 degrees Celsius (° C.), specifically, 180 to 310° C. The pressure can be at atmospheric pressure, supra-atmospheric pressure, or a range of pressures from atmospheric pressure to 15 torr in the initial stages of the reaction, and at a reduced pressure at later stages, for example 0.2 to 15 torr. Likewise, the polymerization can occur in a series of polymerization vessels that can each individually have increasing temperature and/or vacuum. For example, a first stage can occur at a temperature of 100 to 280° C., specifically, 140 to 240° C. and a second stage can occur at a temperature of 240 to 350° C., specifically, 280 to 300° C. or 240 to 270° C. or 250 to 310° C., where the temperature in the second stage is greater than the temperature in the first stage. The reaction time from the initial polymerization unit to the final polymerization unit is generally 0.1 to 15 hours. Likewise, a first stage polymerization can occur at a pressure of greater than or equal to 100 millibars absolute (mbara) or the first stage polymerization can comprise at least two first stage polymerization units where a first-first stage polymerization unit can have a pressure of greater than or equal to 100 mbara and a second-first stage polymerization can have a pressure of 15 to 90 mbara, where the first-first stage polymerization unit is upstream of the second-first stage polymerization unit, where one or more first stage polymerization units can be located before, in between, or after said polymerization units.

After a final polymerization vessel (also referred to as a final polymerization unit), the polymer can be introduced to a reactor, extruded, subjected to filtration in a melt filter, or a combination comprising one or more of the foregoing. It is noted that the melt filter can be located before or after the extruder. For example, the melt polymerization process for the manufacture of a polycarbonate composition can comprise: melt polymerizing a dihydroxy reactant and a carbonate compound to produce a molten reaction product; quenching the molten reaction product; filtering the molten reaction product in a melt filter upstream of any extruders; optionally, introducing an additive to form a mixture; and extruding the mixture to form the polycarbonate composition. Likewise, the melt polymerization process for the manufacture of a polycarbonate composition can comprise: melt polymerizing a dihydroxy reactant and a carbonate compound to produce a molten reaction product; introducing a quencher composition and optionally an additive for form a mixture; and extruding the mixture to form the polycarbonate composition.

Catalysts used in the melt transesterification polymerization production of polycarbonates can include alpha and/or beta catalysts. Beta catalysts are typically volatile and degrade at elevated temperatures. Beta catalysts can therefore be used at early low-temperature polymerization stages. Alpha catalysts are typically more thermally stable and less volatile than beta catalysts.

The alpha catalyst (herein also referred to herein as the catalyst) can comprise a source of alkali and/or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of carbonate, such as $Cs_2CO_3$, $NaHCO_3$, and $Na_2CO_3$, and the like, non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts (herein also referred to as the quaternary catalyst) can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example a hydroxide, phenoxide, halide, carboxylate such as acetate or formate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$ to $R^{23}$ are each methyls and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate (TPPA), tetraphenyl phosphonium phenoxide (TPPP), and combinations comprising at least one of the foregoing. The catalyst can comprise TBPA.

The amount of alpha and beta catalyst used can be based upon the total number of moles of dihydroxy compound used in the polymerization reaction. When referring to the ratio of beta catalyst, for example, a phosphonium salt, to all dihydroxy compounds used in the polymerization reaction, it is convenient to refer to moles of catalyst per mole of the dihydroxy compound, meaning the number of moles of catalyst divided by the sum of the moles of each individual dihydroxy compound present in the reaction mixture. The transesterification catalyst can be used in an amount sufficient to provide $1\times10^{-8}$ to $1\times10^{-5}$, specifically, $1\times10^{-7}$ to $8\times10^{-6}$, more specifically, $3\times10^{-7}$ to $2\times10^{-6}$ moles of catalyst per mole of aromatic dihydroxy compound used. The alpha catalyst can be used in an amount sufficient to provide $1\times10^{-2}$ to $1\times10^{-8}$ moles, specifically, $1\times10^{-4}$ to $1\times10^{-7}$ moles of metal per mole of the dihydroxy compound used. The amount of beta catalyst (e.g., organic ammonium or phosphonium salts) can be $1\times10^{-2}$ to $1\times10^{-5}$, specifically $1\times10^{-3}$ to $1\times10^{-4}$ moles per total mole of the dihydroxy compound in the reaction mixture. The amount of alpha catalyst can be less than the amount of beta catalyst added to the polymerization. Quenching of the transesterification catalysts and any reactive catalyst residues with an acidic compound after polymerization is completed can also be useful in some melt polymerization processes. Removal of catalyst residues and/or quenching agent and other volatile residues from the melt polymerization reaction after polymerization can also be useful in some melt polymerization processes.

The polycarbonate can be, for example, a bisphenol A polycarbonate with a weight average molecular weight of 21800 Daltons with a melt flow of 24 to 32 g/10 min (ASTM D1238-04, 300° C., 2.16 kg).

The polycarbonate can have a melt flow of 4 to 40 g/10 min, for example, 4.5 to 15 g/10 min or 15 to 35 g/10 min as determined by ASTM D1238-04 at 300° C., 1.5 kg. The polycarbonate can have a melt flow of 5 to 15 g/10 min as determined by ASTM D1238-04 at 250° C., 1.5 kg.

The polycarbonate can have terminal hydroxyl groups in an amount of less than or equal to 20 mol %, specifically, less than or equal to 10 mol % based on the molar total of all terminal groups of the polycarbonate. Conversely, the polycarbonate can have terminal hydroxyl groups in an amount of greater than or equal to 20 mol %, specifically, 20 to 80 mol %, more specifically, 30 to 70 mol % based on the molar total of all terminal groups of the polycarbonate.

The polycarbonate (for example, comprising a release agent) can exhibit a relative viscosity ($\eta_r$) of 1.17 to 1.19, wherein the relative viscosity ($\eta_r$) is equal to the ratio $\eta/\eta_o$, wherein the $\eta$ is the viscosity of a solution of the polycarbonate in methylene chloride at concentration of 0.005 g/cm³ at 25° C. and $\eta_o$ is the viscosity of methylene chloride at 25° C. The relative viscosity and the melt index (MI) as determined by JIS K 7210 at 280° C. under a load of 2.16 kg can satisfy the equations (I) and (II):

$$\eta_r \geq -0.0723 \log MI + 1.316 \quad \text{(I) and}$$

$$\eta_r \leq 0.0723 \log MI + 1.324 \quad \text{(II)}$$

The polycarbonate (for example, comprising a release agent) can exhibit a relative viscosity lowering ratio (t) of less than or equal to 1%, wherein t is equal to $[(\eta_r^1 - \eta_r^2)/(\eta_r^1)] \times 100$, wherein $\eta_r^1$ is the relative viscosity ($\eta/\eta_o$) as exhibited by the polycarbonate resin composition, which has been subjected to a continuous molding in a molding machine having a cylinder temperature of 350° C., and $\eta_r^2$ is the relative viscosity ($\eta/\eta_o$) as exhibited by the polycarbonate resin composition which has been subjected to a non-continuous molding in a molding machine having a cylinder temperature of 350° C. wherein the residence time of the resin composition in said molding machine is 10 minutes.

A quencher composition can be added at one or more locations in the present melt preparation of the polycarbonate to reduce the activity of the catalyst. The quencher composition comprises a quenching agent (also referred to herein as a quencher). For example, the quenching agent can comprise a sulfonic acid ester such as an alkyl sulfonic ester of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkylaryl. Examples of alkyl sulfonic esters include benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate. The sulfonic acid ester can comprise alkyl tosylates such as n-butyl tosylate. The sulfonic acid ester can be present in the quencher composition in an amount of 0.1 to 10 volume percent (vol %), specifically, 0.1 to 5 vol %, more specifically, 0.5 to 2 vol % based on the total volume of the quencher composition.

The quenching agent can comprise boric acid esters (e.g., $B(OCH_3)_3$, $B(OCH_2CH_3)_3$, and $B(OC_6H_6)_3$), zinc borate, boron phosphate, aluminum stearate, aluminum silicate, zirconium carbonate, zirconium $C_1$-$C_{12}$ alkoxides, zirconium hydroxycarboxylates, gallium phosphide, gallium antimonide, germanium oxide, $C_1$-$C_{32}$ organogermanium compounds, $C_4$-$C_{32}$ tetraorganotin tin compound, $C_6$-$C_{32}$ hexaorganotin compound (e.g., $[(C_6H_6O)Sn(CH_2CH_2CH_2CH_3)_2]_2O)$, $Sb_2O_3$, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, and titanium oxide, phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, $C_1$-$C_{12}$ dialkyl sulfates (e.g., dimethyl sulfate and dibutyl sulfate), sulfonic acid phosphonium salts of the formula $(R^aSO_3^-)(PR^b_4)^+$ wherein $R^a$ is hydrogen, $C_1$-$C_{12}$ alkyl, $C_6$-$C_{18}$ aryl, or $C_7$-$C_{19}$ alkylaryl, and each $R^b$ is independently hydrogen, $C_1$-$C_{12}$ alkyl or $C_6$-$C_{18}$ aryl, sulfonic acid derivatives of the formula $A^1$-$(Y^1\text{—}SO_3X^1)_m$ wherein $A^1$ is a $C_1$-$C_{40}$ hydrocarbon group having a valence of m, $Y^1$ is a single bond or an oxygen atom, $X^1$ is a secondary or tertiary alkyl group of the formula —$CR^{15}R^{16}R^{17}$, a metal cation of one equivalent, an ammonium cation (e.g, $NR^b_3{}^+$ wherein each $R^b$ is independently hydrogen, $C_1$-$C_{12}$ alkyl or $C_6$-$C_{18}$ aryl), or a phosphonium (e.g., $PR^b_4{}^+$ wherein each $R^b$ is independently hydrogen, $C_1$-$C_{12}$ alkyl or $C_6$-$C_{18}$ aryl) wherein $R^{15}$ is a hydrogen atom or an alkyl group having 1 to 5 carbon atoms, $R^{16}$ is a hydrogen atom, a phenyl group or an alkyl group having 1 to 5 carbon atoms, and $R^{17}$ is the same as or different from $R^{15}$ and has the same definition as $R^{15}$, provided that two of $R^5$, $R^{16}$, and $R^{17}$ cannot be hydrogen atoms, and m is an integer of 1 to 4, provided that when $Y^1$ is a single bond, all of $X^1$ in an amount of m cannot be metal cations of one equivalent, a compound of the formula $^+X^2$-$A^2$-Y—$SO_3{}^-$ wherein $A^2$ is a divalent hydrocarbon group, $^+X^2$ is a secondary, tertiary or quaternary ammonium cation or a secondary (e.g., tertiary or quaternary phosphonium cation, and $Y^1$ is a single bond or an oxygen atom, a compound of the formula $A^3$-$(^+X^3)_n$-$(R$—$Y^1$—$SO_3{}^-)_n$ wherein $A^3$ is a $C_1$-$C_{40}$ hydrocarbon group having a valence of n, $^+X^3$ is a secondary, tertiary or quaternary ammonium cation (e.g., $NR^b_3{}^+$ wherein each $R^b$ is independently hydrogen, $C_1$-$C_{12}$ alkyl or $C_6$-$C_{18}$ aryl), or a secondary, tertiary or quaternary phosphonium cation (e.g., $PR^b_4{}^+$ wherein each $R^b$ is independently hydrogen, $C_1$-$C_{12}$ alkyl or $C_6$-$C_{18}$ aryl), R is a monovalent $C_1$-$C_{40}$ hydrocarbon group, n is an integer of 2 to 4, and $Y^1$ is a single bond or an oxygen atom, a compound of the formula $A^5$-$Ad^1$-$A^4$-$(Ad^2$-$A^5)_l$ wherein $A^5$ is a monovalent or divalent $C_1$-$C_{40}$ hydrocarbon group, $A^4$ is a divalent $C_1$-$C_{40}$ hydrocarbon group, each of $Ad^1$ and $Ad^2$ is independently an acid anhydride group selected from —$SO_2$—O—$SO_2$—, —$SO_2$—O—CO—, and —CO—O—$SO_2$—, and l is 0 or 1, provided that when l is 0, -$(Ad^2$-$A^5)_l$ is a hydrogen atom or a bond between $A^4$ and $A^5$, in which $A^5$ is a divalent hydrocarbon group or a single bond, aminosulfonic esters having the formula $R_aR_bN$-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl, or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like), $R_c$ is hydrogen, and A is $C_1$-$C_{12}$ alkyl, $C_6$-$C_{18}$ aryl, or $C_{17}$-$C_{19}$ alkylaryl (e.g., compounds such as N-(2-hydroxyethyl) piperazine-N'-3-propanesulfonic acid, 1,4,-piperazinebis (ethanesulfonic acid), and 5-dimethylamino-1-naphthalenesulfonic acid), ammonium sulfonic esters of the formula $R_aR_bR_cN^+$-A-$SO_3{}^-$, wherein $R_a$, $R_b$, are each independently hydrogen, $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like), $R_c$ is a hydrogen, and A is $C_1$-$C_{12}$ alkyl, $C_6$-$C_{18}$ aryl, or $C_7$-$C_{19}$ alkylaryl, sulfonated polystyrene, methyl acrylate-sulfonated styrene copolymer, and combinations comprising at least one of the foregoing.

The quencher can comprise a phosphorous acid compound, for example, a phosphorous acid monoester, a phosphorous acid diester, a phosphorous acid triester, a phosphinic ester, an organic phosphonite; a phosphoric ester, a phosphonic ester, or a combination comprising one or more of the foregoing.

The phosphorous acid compound can comprise a phosphorous acid monoester, in which one hydrogen atom of phosphorous acid is substituted with a hydrocarbon group and can be of the formula (119): $R^A$—O—$P(OH)_2$, wherein each $R^A$ independently represent an alkyl group (such as ethyl, butyl, octyl, cyclohexyl, 2-ethylhexyl, decyl, tridecyl, lauryl, pentaerythritol, and stearyl), an aryl group (such as phenyl and naphthyl), or an alkylaryl group (such as tolyl, p-t-butylphenyl, 2,4-di-t-butylphenyl, 2,6-di-t-butylphenyl, p-nonylphenyl, and dinonylphenyl).

The phosphorous acid compound can comprise a phosphorous acid diester, in which two hydrogen atoms of phosphorous acid are substituted with hydrocarbon groups and can be of the formula (120): $(OR^A)_2(PH)O$, wherein $R^A$ is defined above.

The phosphorous acid diester can comprise a phosphorous acid diester with two or more phosphorous atoms and can have the formula (121) and/or (122)

wherein $R^A$ is the same as above and $R^B$ is an alkylene group, an arylene group, or an arylalkylene group.

The phosphorous acid compound can comprise one or more of the phosphorous acid compound of the formulae (123)-(125)

wherein each $R^K$ independently is a hydrogen, an alkyl group (such as ethyl, butyl, octyl, cyclohexyl, 2-ethylhexyl, decyl, tridecyl, lauryl, pentaerythritol, and stearyl), an aryl group (such as phenyl and naphthyl), or an alkylaryl group (such as tolyl, p-t-butylphenyl, 2,4-di-t-butylphenyl, 2,6-di-t-butylphenyl, p-nonylphenyl, and dinonylphenyl), $R^J$ is an alkylene group, allylene group, or an aryl alkylene group, and $R^A$ and $R^B$ are defined above. The phosphorous acid compound can have the formula (126): $(R^AO)_3P$, wherein $R^A$ is defined above. The phosphorous acid compound can comprise a phosphorous acid of the formula (127), wherein each $R^K$ and $R^B$ are defined above.

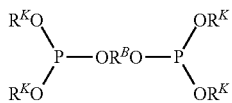
(127)

The phosphorous acid compound can comprise a phosphorous acid of the formula (128), wherein $R^K$ is defined above.

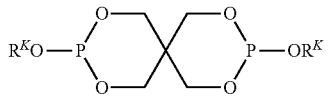
(128)

The phosphorous acid compound can comprise a phosphorous acid of the formula (129), wherein $R^K$ and $R^B$ are defined above.

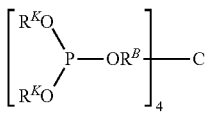
(129)

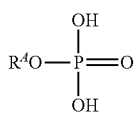
(131)

The phosphorous acid compound can comprise a phosphorus containing compound of the formula (130): $R^A P(OH)_2$ and/or of the formula (131), wherein $R^A$ is defined above.

The phosphorous acid compound can comprise a phosphorous containing ester that can comprise one or more of the following phosphorous containing esters of the formulae (132)-(138), wherein $R^K$ and $R^B$ are defined as above.

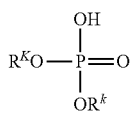
(132)

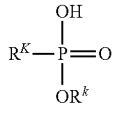
(133)

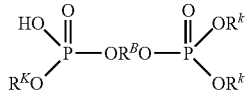
(134)

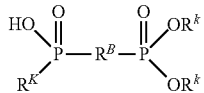
(135)

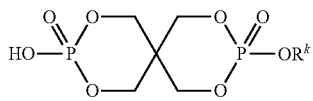
(136)

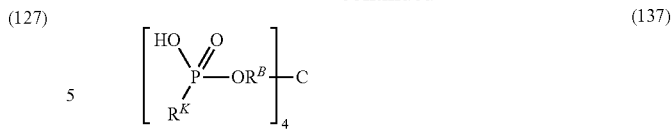
(137)

(138)

The phosphorous acid compound can comprise a phosphorous acid compound of the formula (138): $R^A P(OH)_2$ and/or of the formula (139): $R^A(P=O)(OH)_2$ wherein $R^A$ is defined above.

The thermoplastic composition can comprise at least one compound selected from a phosphorous acid diester and a phosphorous acid monoester and at least one compound selected from a phenolic antioxidant, a phosphorous acid triester, and an organic phosphonite.

Examples of phosphorous acid compounds include phenylphosphonic acid, phenyl dihydrogen phosphite, nonylphenyl dihydrogen phosphite, 2,4-di-t-butylphenyl dihydrogen phosphite, diphenyl hydrogen phosphite, bis(nonylphenyl) hydrogen phosphite, bis(2,4-di-t-butylphenyl) hydrogen phosphite, dicresyl hydrogen phosphite, bis (p-t-butylphenyl) hydrogen phosphite, bis(p-hexylphenyl) hydrogen phosphite, tetrakis (2,4)-di-t-butylphenyl 4,4'-biphenylene diphosphinate, tris(2,4-di-t-butylphenyl) phosphite, tris(nonyl phenyl) phosphite, tris(dinonylphenyl) phosphite, triphenyl phosphite, tetraphenyl dipropylene glycol diphosphite, tetra(tridecyl) 4,4'-isopropylidenediphenyl diphosphite, bis(tridecyl)pentaerythritol diphosphite, bis(nonylphenylpentaerythritol) diphosphite, bis(2,4-di-t-butylphenyl) pentaerythritoldiphosphite, bis(2,6-di-t-butyl-4-methylphenyl) pentaerythritol-diphosphite, distearylpentaerythritol diphosphite, hydrogenated bisphenol A pentaerythritol phosphite polymer, tetraphenyl tetra(tridecyl)pentaerythritol tetraphosphite, and tetrakis-(2,4-di-t-butylphenyl) 4,4'-biphenylenediphosphonite.

The phosphorous acid compound can be present in an amount of 0.0005-0.015 parts by weight, specifically, 0.0005-0.009 parts by weight per 100 parts by weight of polycarbonate. The phosphorous acid compound can be present in an amount of 5 to 3000 ppm based on the total weight of the polycarbonate.

The amount of at least one compound selected from phosphorous acid diesters and phosphorous acid monoesters can be 0.0005-0.015 parts by weight, specifically, 0.0005-0.009 parts by weight per 100 parts by weight of polycarbonate. The amount of phosphorous ester can be 5 to 3000 ppm based on the total weight of the polycarbonate.

The quencher can be free of a phosphorous acid compound, for example, comprising less than 0.0005 parts by weight, specifically, 0 parts by weight per 100 parts by weight of polycarbonate. For example, the method of adding a quencher can be free of a phosphorous acid compound additions step.

The quencher composition can be added in a solid or liquid form. When in the liquid form, the quencher composition can be added, for example, via an addition system. The addition system can comprise a first drum; a buffer drum; a dosing pump; a filter; an injector or a combination comprising one or more of the foregoing, where one or both of the first drum and the buffer drum can comprise an agitator and/or a heating system. For example, the quencher and a liquid carrier can be added to the first drum and then added to a buffer drum. From the buffer drum, the liquid quencher composition can be injected to the polymerization system via an injector located in one or more of a polymerization unit, a reactor, a transfer line, a mixer, and an extruder. The pumping of the quencher composition to a dosing pump can be controlled by a main distribution loop, where the addition of the quencher composition can be monitored with a flow meter, either continuously or intermittently. The pumping can further comprise a controller for automated monitoring of the flow meter and adjustment of the amount of the quencher composition to the polymerization unit. The liquid quencher composition can be added to the polymerized polycarbonate at a pressure of greater than or equal to 2 bars, specifically, greater than or equal to 3 bars, more specifically, 3 to 100 bar. The liquid quencher composition can likewise be added by spraying the liquid onto a solid polycarbonate substrate. The liquid quencher composition can be filtered before it is added to the polymerization system.

When in the solid form, the quencher composition can comprise a quencher and, optionally, a solid carrier, for example, a polycarbonate powder, where the polycarbonate powder can comprise, for example, a melt polycarbonate as herein described in a powder form and/or an interfacial polycarbonate. When in the solid form, the solid quencher composition can be added only directly to and/or downstream of an extruder, for example, in a masterbatch or by spraying onto a solid polycarbonate substrate. Likewise, the solid quencher composition can be added via a feeder, for example, a screw feeder. Specifically, a process for adding a solid quencher composition can comprise pelletizing a melt polymerized polycarbonate to form a polycarbonate; feeding the polycarbonate to an extruder; adding a solid quencher composition to the polycarbonate; and mixing the quencher composition with the polycarbonate for a period of time of greater than or equal to 5 seconds prior to the addition to the polycarbonate of any reactive additive, wherein the reactive additive has a reactive OH group or reactive ester group. The polycarbonate can be melted prior to adding the solid quencher composition.

The solid quencher composition can comprise 0.1 to 100 wt %, specifically, 10 to 99 wt % quencher, based on the total weight of the solid quencher composition.

When in the liquid form, the quencher composition can comprise a liquid carrier. The liquid carrier can comprise a low boiling point solvent such that the boiling point of the low boiling point solvent is less than that of a quenching agent present in the quenching composition. For example, if the quenching agent comprises butyl tosylate, then the low boiling point solvent can have a boiling point of less than 140° C. The low boiling point solvent can be essentially unreactive with the polycarbonate at the temperature and pressure conditions in the extruder, for example, at high temperatures under vacuum. The low boiling point solvent can be capable of solubilizing the quenching agent. The low boiling point solvent can comprise xylene, toluene, benzene, ethylbenzene, anisole, chlorobenzene, and combinations comprising one or more of the foregoing. The low boiling point solvent can comprise water, an organic solvent (such as acetone), or a combination comprising one or both of the foregoing.

The liquid carrier can comprise a high boiling point solvent such that the boiling point of the high boiling point solvent is greater than or equal to that of a quenching agent present in the quenching composition. For example, if the quenching agent comprises butyl tosylate, then the low boiling point solvent can have a boiling point of greater than or equal to 140° C. The high boiling point solvent can comprise a compound present in the melt polymerization. For example, in the melt polymerization of a bisphenol A polycarbonate, the high boiling point solvent can comprise diphenylcarbonate, phenol, bisphenol A, the polycarbonate oligomers, bisphenol A derivatives, propylene carbonate, or a combination comprising one or more of the foregoing.

If both a low boiling point solvent and the high boiling point solvent are present, then they can be soluble in each other. A ratio of the low boiling point solvent and the high boiling point solvent in the quencher composition can be 4:1 to 1:4, specifically, 2:1 to 1:2, more specifically 1.5:1 to 1:1.5. Likewise, the quencher composition can be free of a liquid carrier.

The liquid carrier can be free of water as it was surprisingly found that a higher injection pressure could be used with a non-water carrier, resulting in a potentially more stable injection. For example, the liquid carrier can comprise 0 to 0.1 wt % of water. The adding the non-water liquid quencher composition to the polymerized polycarbonate can occur at a pressure of greater than or equal to 3 bars (0.3 megaPascals (MPa)).

The liquid carrier can be free of phenol. The liquid carrier can comprise of phenol and can result in a reduction in molecular weight of the polycarbonate. For example, the polycarbonate can have a weight average molecular weight of 55,000 Daltons to 80,000 Daltons prior to phenol addition and can have a weight average molecular weight of less than or equal to 50,000 Daltons after phenol addition and based on polycarbonate standards.

The liquid quencher composition can comprise 0.1 to 99 wt %, specifically, 1 to 50 wt %, more specifically, 1 to 20 wt % quencher based on the total weight of the liquid quencher composition.

Likewise, the quencher composition can be free of a carrier. For example, the quencher composition can include the quencher, additive(s), and no carrier; e.g., can consist of the quencher and an optional additive. The quencher can be added as a molten (i.e. a melted) quencher. When the quencher composition is free of a carrier, the quencher composition can comprise 0.1 to 100 wt % quencher, based on the total weight of the carrier free quencher composition.

The quencher can be added in an amount of greater than or equal to 5 parts per million by weight (ppm), specifically, greater than or equal to 10 ppm based on the total amount of the polymerized polycarbonate. The quencher can be added in an amount of less than or equal to 5 ppm, specifically, less than or equal to 10 ppm based on the total amount of the polymerized polycarbonate. The quencher composition can be added to the polymerization unit such that the quencher is added in an amount of 0.5 to 15 ppm, specifically, 1 to 10 ppm, more specifically, 1.5 to 5 ppm, even more specifically, 1.5 to 3 ppm based on the total weight of the polymerized polycarbonate. Likewise, the quencher composition can be added to the polymerization unit such that the quencher is added in an amount of 5 to 10 ppm, specifically, 6 to 8 ppm based on the total weight of the polymerized polycarbonate. Likewise, the quencher can be added such that the quencher or derivatives thereof are present in an amount of 0.1 to 50 times, specifically, 0.5 to 30 times, per the neutralization equivalent of the catalyst used.

The quencher composition can be added at one or more locations in the melt preparation of the polycarbonate. For example, the quencher composition can be added upstream of a polymerization unit, directly into a polymerization unit (for example, at an inlet, in a side feeder, in an outlet, or a combination comprising one or more of the foregoing), downstream of a polymerization unit, in a reactor that is not polymerizing polycarbonate, upstream of an extruder, directly into an extruder (for example, at the throat of the extruder, in a side feeder, in an outlet, or a combination comprising one or more of the foregoing), downstream of an extruder, or a combination comprising one or more of the foregoing. When added upstream of an extruder, the quencher composition can be added upstream of a final polymerization unit and/or into a final polymerization unit and/or after a final polymerization unit. The quencher composition can be added in the outlet of a first polymerization unit, in the outlet of a second polymerization unit, in a reactor located in between a final polymerization unit and an extruder, in an extruder, or a combination comprising one or more of the foregoing. Likewise, an amount of the quencher composition can be added into and/or after one or more of the staged polymerization units and/or into a finishing extruder. For example, the quencher composition can be added after an initial polymerization unit, fresh catalyst can then be added, and after further polymerization, additional quencher can be added.

The polymerization process can comprise a section of parallel polymerization, where parallel polymerization refers to the splitting of a polymerized polycarbonate stream into two or more streams that may or may not experience the same polymerization conditions thereafter (i.e. they can attain different molecular weights, have different additives added thereto, etc.). For example, polycarbonate can be prepared in a first portion of the polymerization process; a stream comprising polymerized polycarbonate can be split into two or more streams and directed to 2 or more parallel operating lines. For example, a process can comprise polymerizing polycarbonate in a series of first stage polymerization units; a stream exiting the first stage can be split into two streams: A and B, where stream A is directed to second stage polymerization unit A and stream B is directed to second stage polymerization unit B. Likewise, a process can comprise polymerizing polycarbonate in a series of first stage polymerization units followed by polymerizing in a series of second stage polymerization units; a stream exiting the second stage can be split into two streams: A and B, where stream A is directed to extruder A and stream B is directed to extruder B. Likewise, a process can comprise polymerizing polycarbonate in a series of first stage polymerization units followed by polymerizing in a series of two second stage polymerization units; a stream exiting the first-second stage polymerization unit can be split into two streams: A and B, where stream A is directed to second-second stage polymerization unit A and stream B is directed to second-second stage polymerization unit B. In any of the aforementioned scenarios, a quencher composition can be added to one or both of streams A and B, where the quencher composition can be the same or different. One skilled in the art can readily envision other embodiments comprising more than 2 parallel streams and embodiments where the streams are split at different locations.

When the quencher composition is added to a polymerization unit and/or to an extruder, the quencher composition can optionally be mixed, for example, by means of a Henschel mixer, and introduced to a feeder, such as a gravimetric feeder, and then fed to a polymerization unit and/or to an extruder through a feeder, such as a side feeder and/or directly into a throat of the extruder.

When the quencher composition is added to a connecting stream that connects a first unit to a second unit, then the connecting stream comprising the added quencher composition can be mixed via, for example, the establishment of a turbulent flow, an in-line mixer, for example, a static mixer located in a pipe that contains the connecting stream and/or in a mixer unit that houses a rotating paddle, for example a continuously stirred tank. Mixing can occur for 0.3 to 5 minutes, for example, 0.5 to 3 minutes, for example, 1 to 2 minutes. Likewise, the quencher composition can be added to the connecting stream without mixing.

The quencher composition can be added after the formation of the polycarbonate, i.e. after extruding and/or melt filtering. For example, after the polycarbonate is prepared, the polycarbonate can be mixed with a quencher composition, for example, in an in-line mixer, a twin barrel mixer, or the like, and then pelletized. Likewise, the polycarbonate can first be pelletized and then the quencher composition can be introduced. The quencher composition can be added, for example, by flowing or spraying, in the solid or liquid form onto polycarbonate pellets and can optionally be mixed with the pellets in, for example, a melt kneader. In this scenario, an additive can be introduced after the introduction of the quencher composition. For example, a pelletized polycarbonate, for example, one that is free of an additive, can be combined with a quencher composition and an antioxidant and/or a release agent can then be added.

The polycarbonate can be devolatized to remove low molecular weight (such as those with a molecular weight of less than or equal to 1,000 Daltons). Devolatization can occur in a polymerization unit (for example, in a second stage polymerization unit), in a reactor, in an extruder, in a mixer, or in a combination comprising one or more of the foregoing. The polycarbonate can be quenched prior to devolatization. For example, a quencher can be added upstream of and/or directly to an extruder, the extruder can be devolatized, and an additive can be added.

It is noted that an amount of water can be added to extruder 4 to devolatilize the polycarbonate. The amount of water that can be introduced can be 0.1 to 10 wt %, specifically, 0.3 to 5 wt % based on the total weight of the polycarbonate.

FIG. 1 illustrates a method of adding the quencher composition to a polymerization system. In FIG. 1, the liquid quencher composition can be added via one or more of quencher streams 40-50. For example, quencher stream 40 can be added to stream 20 and stream 20 can then optionally be mixed in mixer 10; quencher stream 42 can be added to reactor unit 2, where reactor unit 2 can be one or more of a first polymerization vessel, a middle polymerization vessel(s), a final polymerization vessel, and a reactor located after a final polymerization vessel; quencher stream 44 can be added to polymerized stream 22, and polymerized stream 22 can then be optionally mixed in mixer 10; quencher stream 46 can be added to the extruder 4 via the extruder throat 8; quencher stream 48 can be added to the extruder 4 via side feeder 12; and quencher stream 50 can be added to extruded stream 24 and can be optionally mixed in mixer 10. Extruded stream 24 can be fed to melt filter 6 to form polycarbonate composition stream 26. Mixer 10 can be, for example, an in-line mixer, a turbulent flow, or a continuously stirred unit. It is noted that melt filter 6 can likewise be located upstream of extruder 4 and that a quencher composition can be added before and/or after the melt filter. It is further noted that while streams 42, 56, and 58 are illustrated as entering a side of the respective vessels, it is readily understood that these streams can enter the vessel at any appropriate location.

FIG. 1 further illustrates a method of adding a liquid quencher composition to a polycarbonate that is further pelletized. Specifically, FIG. 1 shows that the liquid quencher composition can be added via one or more of quencher streams 52-58. For example, quencher stream 52 can be added to optional mixer 14, where optional mixer 14 can be, for example, an in-line mixer, a turbulent flow, or a continuously stirred unit (such as a twin barrel extruder); quencher stream 56 can be added to pelletizer 16, for example at a throat of the pelletizer; quencher stream 58 can be added to pelletized stream 30, for example by spraying the quencher composition on the formed pellets.

In FIG. 1 the solid quencher composition can be added via one or more of quencher streams 46-50. For example, quencher stream 46 can be added to the extruder 4 via the extruder throat 8; quencher stream 48 can be added to the extruder 4 via side feeder 12; and quencher stream 50 can be added to extruded stream 24 and can be optionally mixed in mixer 10. Extruded stream 24 can be fed to melt filter 6 to form polycarbonate composition stream 26. Mixer 10 can be, for example, an in-line mixer, a turbulent flow, or a continuously stirred unit. It is noted that melt filter 6 can likewise be located upstream of extruder 4 and that a quencher composition can be added before and/or after the melt filter.

FIG. 1 further illustrates a method of adding the solid quencher composition to a polycarbonate composition that is further pelletized. Specifically, FIG. 1 shows that the quencher composition can be added via one or more of quencher streams 52-58. For example, quencher stream 52 can be added to optional mixer 14, where optional mixer 14 can be, for example, an in-line mixer, a turbulent flow, or a continuously stirred unit (such as a twin barrel extruder); quencher stream 56 can be added to pelletizer 16, for example at a throat of the pelletizer; quencher stream 58 can be added to pelletized stream 30, for example by spraying the quencher composition on the formed pellets. It is further noted that while quencher streams 56 and 58 are illustrated as entering a side of the respective vessels, it is readily understood that these streams can enter the vessel at any appropriate location.

An additive can further be added at one or more locations in the present melt preparation of the polycarbonate. For example, the additive can be added upstream of a polymerization unit, directly into a polymerization unit (for example, at an inlet, in a side feeder, in an outlet, or a combination comprising one or more of the foregoing), downstream of a polymerization unit, in a reactor that is not polymerizing polycarbonate, upstream of an extruder, directly into an extruder (for example, at the throat of the extruder, in a side feeder, in an outlet, or a combination comprising one or more of the foregoing), downstream of an extruder, or a combination comprising one or more of the foregoing. The additive can be added as part of the quencher composition and/or can be added separately. For example, quencher composition comprising a heat stabilizer can be added to the polycarbonate and an additive composition comprising a release agent and a UV agent can be added to the quenched composition. The additive can be added in a molten state or can be added after an extruded polycarbonate is re-melted. The additive can be filtered prior to being added into the polymerization unit.

The additive can comprise, for example, an impact modifier, a flow modifier, a filler (e.g., a particulate polytetrafluoroethylene (PTFE), glass, carbon, a mineral, or metal), a reinforcing agent (e.g., glass fibers), an antioxidant, a heat stabilizer, a light stabilizer, an ultraviolet (UV) agent (such as a UV light stabilizer and a UV absorbing additive), a plasticizer, a lubricant, a release agent (such as a mold release agent (such as glycerol monostearate, pentaerythritol stearate, glycerol tristearate, stearyl stearate, and the like)), an antistatic agent, an antifog agent, an antimicrobial agent, a colorant (e.g, a dye or pigment), a surface effect additive, a radiation stabilizer, a flame retardant, an anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 weight percent (wt %), or 0.01 to 5 wt %, each based on the total weight of the polymer in the polymerized composition.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can comprise tris(2,4-di-t-butylphenyl) phosphate available as IRGAPHOS™ 168. The heat stabilizer can comprise IRGAPHOS™ 205. Heat stabilizers are generally used in amounts of 0.01 to 5 wt %, based on the total weight of polymer in the composition.

The term "antistatic agent" refers to monomeric, oligomeric, or polymeric materials that can be processed into polymers and/or sprayed onto materials or articles to improve conductive properties and overall physical performance. Examples of monomeric antistatic agents include ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium polymers, imidazoline derivatives, sorbitan esters, ethanolamides, betaines, or the like, or combinations comprising at least one of the foregoing monomeric antistatic agents.

Polymeric antistatic agents include certain polyesteramides, polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT™ 6321 (Sanyo) or PEBAX™ MH1657 (Atofina), IRGASTAT™ P18 and P22 (Ciba-Geigy). Other polymeric materials that can be used as antistatic agents are inherently conducting polymers such as polyaniline (commercially available as PANIPOL™ EB from Panipol), polypyrrole and polythiophene (commercially available from Bayer), which retain some of their intrinsic conductivity after melt processing at elevated temperatures. In an embodiment, carbon fibers, carbon nanofibers, carbon nanotubes, carbon black, or a combination comprising at least one of the foregoing can be used in a polymer composition containing chemical antistatic agents to render the composition electrostatically dissipative.

Radiation stabilizers can also be present, specifically gamma-radiation stabilizers. gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C$_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

The dye and/or colorant can comprise an anthraquinone colorant and/or dye. Examples of anthraquinone colorant and/or dye are MACROLEX™ Violet B and MACROLEX™ Blue RR commercially available from Lanxess, MACROLEX™ Blue 3R, SUMIPLAST™ Violet RR commercially available from Sumitomo Chemical Co., Ltd., SUMIPLAST™ Violet B, SUMIPLAST™ Blue OR, DIARESIN™ Violet D commercially available from Mitsubishi Chemical, DIARESIN™ Blue G, and DIARESIN™ Blue N.

The colorant and/or dye can be present in an amount of 0.00001 to 0.0002 parts by weight, specifically, 0.00001 to 0.00015 parts by weight, more specifically, 0.00002 to 0.0001 parts by weight, based on the total weight of the composition. The thermoplastic composition can have a b* value of 1.2 to 3.1, specifically, 1.5 to 3.0, more specifically, 1.8 to 2.9 and can satisfy the equation: $b^* \leq 1.65 \times L - 145.5$, wherein b* and L are determined according to the CIELAB method (Comission Inetrnationale de l'Eclairage 1976 L *a*b Diagram), on a 3.2 mm thick film.

Possible fillers or reinforcing agents include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, TiO$_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly (vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Fillers are used in amounts of 1 to 200 parts by weight, based on 100 parts by weight of the total composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants can be used in amounts of 0.01 to 0.1 parts by weight, based on 100 parts by weight of the total composition, excluding any filler. The antioxidant can be present in an amount of 0.00005 to 0.3, specifically, 0.0005 to 0.22 parts by weight (pbw) based on the total composition, excluding any filler.

The antioxidant can comprise a phenolic antioxidant represented by the formula (110), wherein each $R^D$ is independently a hydrogen atom, a hydroxyl group, an alkoxyl group, or a hydrocarbon residue, which can have a substituent, with a proviso that at least one of $R^D$ represents a hydrocarbon residue which can have a substituent. Examples of phenolic antioxidants are 2,6-di-t-butyl-p-cresol, 2,6-di-t-butyl-p-anisole, 2,6-di-t-butyl-4-ethylphenol, 2,2'-methylenebis(6-t-butyl-p-cresol), 2,2'-methylenebis-(4-ethyl-6-t-butylphenol), 4,4'-methylenebis(6-t-butyl-o-cresol), 4,4'-butylidenebis(6-t-butyl-m-cresol), tetrakis-[methylene-3-(3',5'-di-t-butyl-4'-hydroxyphenyl) propionate]methane, 4,4'-thiobis(6-t-butyl-m-cresol), stearyl-β-(3,5-di-t-butyl-4-hydroxyphenyl) propionate, 1,3, 5-trimethyl-2,4,6-tris(3,5-di-t-butyl-4-hydroxybenzyl)benzene, 1,1,3-tris(2-methyl-4-hydroxy-5-t-butylphenyl)butane, and triethylene glycol-bis[3-(3-t-butyl-5-methyl-4-hydroxyphenyl)propionate].

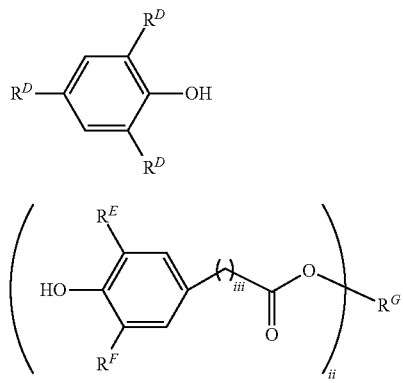

(110)

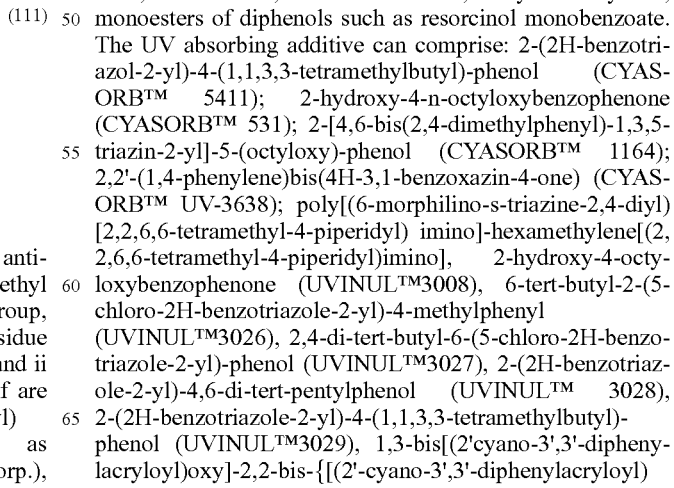

(111)

The phenolic antioxidant can comprise a phenolic antioxidant of the formula (111), wherein $R^E$ represents a methyl group or a t-butyl group and $R^F$ represents a t-butyl group, $R^G$ represents a $C_{1-30}$ hydrocarbon or heterocyclic residue having a valence of ii, iii represents an integer of 1-4 and ii represents an integer of 1 or more. Examples thereof are tetrakis-[methylene-3-(3',5'-di-t-butyl-4'-hydroxyphenyl) propionate]methane (commercially available as IRGANOX™ 1010 manufactured by Ciba-Geigy Corp.), stearyl-β-(3,5-di-t-butyl-4-hydroxyphenyl) propionate (commercially available as IRGANOX™ 1076 manufactured by Ciba-Geigy Corp.), and triethylene glycol-bis[3-(3-t-butyl-5-methyl-4-hydroxyphenyl) propionate.

The phenolic antioxidant can comprise a phenolic antioxidant containing a phosphorous atom. Examples thereof are 3,5-di-t-butyl-4-hydroxybenzylphosphonate-diethyl ester (commercially available as IRGANOX™ 1222 manufactured by Ciba-Geigy Corp.) and bis(ethyl-3,5-di-t-butyl-4-hydroxybenzylphosphonate)calcium (commercially available as IRGANOX™ 1245ML manufactured by Ciba-Geigy Corp.)

The phenolic antioxidant can be added in an amount of 0.0005 to 0.1 parts by weight, specifically, 0.0005 to 0.07 parts by weight, more specifically, 0.001 to 0.05 parts by weight based on 100 parts by weight of the total composition excluding any filler.

The phenolic antioxidant can be added in an amount satisfying the following formula (100): $20 \times 10^5 M \le X \le 20 \times 10^5 M + 2,100$, wherein X represents the amount of said phenolic antioxidant (ppm), based on the total weight of the polycarbonate, and M represents the amount of the terminal hydroxyl groups (mol/g polycarbonate). The phenolic antioxidant can be added in an amount satisfying the following formula (101): $30 \times 10^5 M \le X \le 20 \times 10^5 M + 1,600$, wherein X and M are defined above. The phenolic antioxidant can be added in an amount satisfying the following formula (102): $35 \times 10^5 M \le X \le 20 \times 10^5 M + 1,200$, wherein X and M are defined above. When the phenolic antioxidant is present in an amount according to any of formulas (100), (101), or (102) then: 1) the phenolic antioxidant can comprise octadecyl-3-(3,5-di-t-butyl-4-hydroxyphenyl) propionate; 2) an amount of at least one metal selected from an alkali metal and an alkaline earth metal (such as lithium, sodium, potassium, cesium, magnesium, calcium, strontium, and barium) can be less than or equal to 800 parts per billion by weight (ppb), specifically, less than or equal to 400 ppb, more specifically, less than or equal to 200 ppb based on the total weight of the polycarbonate; 3) an amount of at least one metal other than an alkali metal and an alkaline earth metal can be less than or equal to 1 ppm, based on the total weight of the polycarbonate; and 4) the polycarbonate can have terminal hydroxyl groups in a proportion of less than or equal to 20 mol %, specifically, 20 to 80 mol %, more specifically, 30 to 70 mol % based on the molar total of all terminal groups of the polycarbonate.

UV absorbing additives include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate. The UV absorbing additive can comprise: 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); poly[(6-morpholino-s-triazine-2,4-diyl) [2,2,6,6-tetramethyl-4-piperidyl) imino]-hexamethylene[(2, 2,6,6-tetramethyl-4-piperidyl)imino], 2-hydroxy-4-octyloxybenzophenone (UVINUL™3008), 6-tert-butyl-2-(5-chloro-2H-benzotriazole-2-yl)-4-methylphenyl (UVINUL™3026), 2,4-di-tert-butyl-6-(5-chloro-2H-benzotriazole-2-yl)-phenol (UVINUL™3027), 2-(2H-benzotriazole-2-yl)-4,6-di-tert-pentylphenol (UVINUL™ 3028), 2-(2H-benzotriazole-2-yl)-4-(1,1,3,3-tetramethylbutyl)-phenol (UVINUL™3029), 1,3-bis[(2'cyano-3',3'-diphenylacryloyl)oxy]-2,2-bis-{[(2'-cyano-3',3'-diphenylacryloyl)

oxy]methyl}-propane (UVINUL™ 3030), 2-(2H-benzotriazole-2-yl)-4-methylphenol (UVINUL™3033), 2-(2H-benzotriazole-2-yl)-4,6-bis(1-methyl-1-phenyethyl) phenol (UVINUL™ 3034), ethyl-2-cyano-3,3-diphenylacrylate (UVINUL™3035), (2-ethylhexyl)-2-cyano-3,3-diphenylacrylate (UVINUL™3039), N,N'-bisformyl-N,N'-bis(2,2,6,6-tetramethyl-4-piperidinyl)hexamethylendiamine (UVINUL™4050H), bis-(2,2,6,6-tetramethyl-4-piperidyl)-sebacate (UVINUL™ 4077H), bis-(1,2,2,6,6-pentamethyl-4-piperidyl)-sebacate+methyl-(1,2,2,6,6-pentamethyl-4-piperidyl)-sebacate (UVINUL™4092H) 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; TINUVIN™ 234; nano-size inorganic materials such as titanium oxide, cerium oxide, and zinc oxide, all with particle size less than or equal to 100 nanometers; or the like, or combinations comprising at least one of the foregoing UV absorbers.

The UV absorbing additive can comprise: 2-(5-methyl-2-hydroxyphenyl)-2H-benzotriazole, 2-[2-hydroxy-3,5-bis(alpha, alpha dimethylbenzyl)phenyl]-2H-benzotriazole, 2-(2'-hydroxy-5'-t-octylphenyl) benzotriazole, 2,2-methylene bis [4-(1,1,3,3-tetramethylene butyl)-6-(2H-benzotriazole-2-yl) phenol], 2-hydroxy-4-octoxybenzophenone, 2,4-dihydroxybenzophenone, 2-hydroxy-4-methoxy-4'-chloro benzophenone, 2,2-dihydroxy-4-methoxybenzophenone, 2,2-dihydroxy-4,4'-dimethoxybenzophenone, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxy phenyl)-1,3,5-triazine, 2,4-diphenyl-6-(2-hydroxy-4-octyloxy phenyl)-1,3,5-triazine, 2,4-diphenyl-6-(2-hydroxy-4-dodecyloxy phenyl)-1,3,5-triazine, 2,4-diphenyl-6-(2-hydroxy-4-benzyloxyphenyl)-1,3,5-triazine, 2,4-diphenyl-6-(2-hydroxy-4-(2-butoxyethoxy) phenyl)-1,3,5-triazine, 2,4-di-p-toluyl-6-(2-hydroxy-4-methoxyphenyl)-1,3,5-triazine, 2,4-di-p-toluyl-6-(2-hydroxy-4-ethoxyphenyl)-1,3,5-triazine, 2,4-di-p-toluyl-6-(2-hydroxy-4-propoxyphenyl)-1,3,5-triazine, 2,4-di-p-toluyl-6-(2-hydroxy-4-butoxyphenyl)-1,3,5-triazine, 2,4-di-p-toluyl-6-(2-hydroxy-4-hexyloxy phenyl)-1,3,5-triazine, 2,4-di-p-toluyl-6-(2-hydroxy-4-octyloxy phenyl)-1,3, 5-triazine, 2,4-di-p-toluyl-6-(2-hydroxy-4-dodecyloxy phenyl)-1,3,5-triazine, 2-(4,6-diphenyl-1,3,5-triazine-2-yl)-5-(hexyl) oxy-phenol, 2,4-di-p-toluyl-6-(2-hydroxy-4-benzyloxyphenyl)-1,3,5-triazine, 2,4-di-p-toluyl-6-(2-hydroxy-4-(2-hexyloxy ethoxy) phenyl)-1,3,5-triazine, t-butylphenyl salicylate, octylphenylsalicylate, or a combination comprising one or more of the foregoing.

UV absorbers can be used in amounts of 0.01 to 20, specifically, 0.02 to 15, more specifically, 0.02 to 1 part by weight, based on 100 parts by weight of polycarbonate and any impact modifier. UV absorbers that can be particularly useful with the polycarbonate compositions disclosed herein include 2-(2H-benzotriazol-2-yl)-4-(1,1,3,3-tetramethylbutyl)-phenol (e.g., CYASORB™ 5411 commercially available from Cytec Industries, Inc., Woodland Park, N.J.) and 2,2'-(1,4-phenylene)bis(4H-3,1-benzoxazin-4-one) (e.g., CYASORB™ UV-3638, commercially available from Cytec Industries, Inc., Woodland Park, N.J.), and combinations comprising at least one of the foregoing. The UV absorbers can be present in an amount of 0.01 to 1 wt %, specifically, 0.1 to 0.5 wt %, and more specifically, 0.15 to 0.4 wt %, based upon the total weight of the total composition, excluding any filler.

Plasticizers, lubricants, and/or mold release agents can also be used and are herein referred to collectively as mold release agents. There is considerable overlap among these types of materials, which include, for example, phthalic acid esters such as dioctyl-4,5-epoxy-hexahydrophthalate; tris-(octoxycarbonylethyl) isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean and/or linseed oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like.

The mold release agent can comprise compound of formula (I)

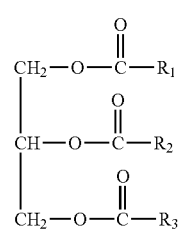

(I)

wherein $R_1$, $R_2$, and $R_3$ can be the same or different hydrocarbon chains with 8 to 20 carbon atoms and 0 to 6 unsaturations, wherein $R_1$, $R_2$, and $R_3$ are each independently selected from $C_8$-$C_{20}$ alkyl, $C_8$-$C_{20}$ haloalkyl, $C_8$-$C_{20}$ polyhaloalkyl, $C_8$-$C_{20}$ alkene, and $C_8$-$C_{20}$ alkoxy. $R_1$, $R_2$, and $R_3$ can each independently be from $C_{17}H_{35}$ or all $R_1$, $R_2$, and $R_3$ can be $C_{17}H_{35}$. The mold release agent can comprise glycerol monostearate, glycerol monopalmitate, glycerol tristearate, glycerol tristearate, stearyl stearate, or a combination comprising one or more of the foregoing. One or more of the aforementioned can have an acid value of 2 to 20 milligrams (mg) KOH as determined by: adding 100 milliliters (ml) of isopropanol to 2.5 grams (g) of a partial ester to thereby dissolve the partial ester; phenolphthalein is added to the resultant solution as an indicator; titrating the resultant mixture using a 0.1 moles per liter (mol/L) standard solution of potassium hydroxide to thereby obtain the acid value (mg KOH). In the measurement of the acid value, when it is expected that the partial ester has an acid value of 1 or less, the amount of the partial ester subjected to measurement is changed to 20 g; when it is expected that the partial ester has an acid value of from 1 to 4, the amount of the partial ester subjected to measurement is changed to 10 g; and when it is expected that the partial ester has an acid value of 15 or more, the amount of the partial ester subjected to measurement is changed to 0.5 g.

The mold release agent can comprise one or more of a polyhydric alcohol (such as ethylene glycol, glycerin, trimethylolpropane, and pentaerythritol), a $C_{10-30}$ saturated fatty acid (such as pulmitic acid, stearic acid, eicosanoic acid, and behenic acid), a partial ester (such as stearic acid monoglyceride and pulmitic acid monoglyceride), and a full ester (such as pentaerythritol tetra stearate, glycerol monostearate, and glycerol tristearate), wherein the sum total acid value can be 2 to 20, specifically, 4 to 18, more specifically, 5 to 15 mg potassium hydroxide (KOH). The ratio of the partial ester and the full ester can be 80:20 to 20:80, specifically, 80:20 to 50:50.

The mold release agent can be present in an amount of 0.01 to 5 parts by weight, specifically, 0.01 to 0.1 parts by weight, more specifically, 0.015 to 0.08 parts by weight, even more specifically, 0.02 to 0.06 parts by weight based on 100 parts by weight of polycarbonate and any impact modifier. The mold release agent can be present in an amount of 0.0005 to 5 parts by weight, specifically, 0.0005 to 1.0 parts by weight, more specifically, 0.001 to 0.3 parts by weight, even more specifically, 0.002 to 0.1 parts by weight, still more specifically, 0.003 to 0.06 parts by weight based on 100 parts by weight of the polycarbonate and any impact modifier.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler.

The flame retardant can comprise a flame retardant of the formula (200)

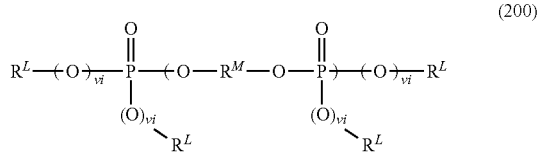

(200)

wherein each $R^L$ independently is an alkyl group (such as a $C_{1-8}$ alkyl, specifically, $C_{1-4}$ alkyl group), a cycloalkyl group (such as a substituted cycloalkyl group, where the substituent can be an alkyl (such as a $C_{1-4}$ alkyl), a halogen, an alkoxy group, an alkylthio group, an aryl group, an aryloxy group, an arylthio group, and an aryl halide group), and an aryl group; $R^M$ is an alkyl group or a cycloalkyl group (such as a bisphenol type, with a valency of greater than or equal to two (such as hydroquinone, resorcinol, diphenylolmethane, diphenylol dimethylmethane (bisphenol A), dihydroxydiphenyl, p,p'-dihydroxy diphenylsulfone, and dihydroxynaphthalene); iv is an integer, specifically, 1 to 5, more specifically, 1 to 3, even more specifically, 1 to 2; and each vi independently is 0 or 1. When one or more of the $R^L$ groups is an alkyl group and one or more of the $R^L$ groups is a cycloalkyl group, then the ratio of the alkyl groups to the cycloalkyl groups can be 0.1 to 0.8, specifically, 0.2 to 0.6.

The composition can comprise one or more flame retardants of the formula (200), where the weighted average value of iv of all of the flame retardants of the formula (200) can be 1 to 5, specifically, 1 to 3, more specifically, 1 to 2. When two or more flame retardants of the formula (200) are present, then a flame retardants of the formula (200) having an iv value of 1 can be present in an amount greater than or equal to 50 wt %, specifically, greater than or equal to 60 wt % based on the total weight of the total flame retardants of the formula (200). The flame retardant of the formula (200) can be present in an amount of 0.1 to 30, specifically, 0.5 to 20, more specifically, 5 to 15 parts by weight based on the total amount of the composition. All of the $R^L$ groups can be aryl groups.

If the composition comprises a flame retardant of the formula (200) and a second organophosphorus compound, the second organophosphorus compound can be present in an amount of less than or equal to 40 wt %, specifically, less than or equal to 30 wt % based on the total weight of the flame retardant of the formula (200) and the second organophosphorus compound.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight, more specifically 2 to 20 parts by weight, based on 100 parts by weight of the total composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoroanion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. A TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Antidrip agents can be used in amounts of 0.1 to 10 parts by weight, based on 100 parts by weight of the total composition, excluding any filler.

The PTFE can be added to the polycarbonate by first coating an aqueous dispersion of PTFE onto the polycarbonate, for example, in the form of polycarbonate pellets, such that a uniform coating is applied, followed by melt mixing and/or extruding the coated polycarbonate. The coating layer can have an average thickness of 0.5 to 15 micrometers, specifically, 0.5 to 5 micrometers. The aqueous dispersion of PTFE can be prepared by solution or emulsion polymerization and is commercially available as an aqueous dispersion, for example, as Teflon 30-J, which is commercially available from Dupont-Mitsui Fluorochemicals and polychlorofluorocarbon TFE dispersion D-1 (with a solids concentration of 60 wt %, a particle diameter of 0.20-0.40 micron, and a pH value of 9-10), which is commercially available from Daikin Industries, LTD. The aqueous dispersion of PTFE can have a PTFE solids content of 10 to 70 wt %, specifically, 30 to 65 wt %, more specifically, 50 to 65 wt % based on the total weight of the dispersion. The PTFE in the dispersion can have an average particle diameter of 0.05 to 5, specifically 0.5 to 1 micrometers.

The composition can comprise melamine, magnesium hydroxide, aluminium hydroxide, antimony oxide, bismuth oxide, an inorganic phosphorus compound (such as red phosphorus, phosphine, hypophosphorous acid, phosphorous acid, metaphosphoric acid, pyrophoric acid, and a phosphoric anhydride), a metallic oxide (such as a zinc oxide and tin oxide), expanded graphite, silica, glycidyl compounds (such as phenyl glycidyl ether, allyl glycidyl ether, t-butylphenyl glycidyl ether, diglycidyl ether of bisphenol A, diglycidyl ether of tetra-bromobisphenol A, diglycidyl phthalate, and diglycidyl hexahydrophthalate), epoxycyclohexane compounds (such as 3,4-epoxycyclohexylmethyl-3,4-epoxycyclohexane carboxylate, 3,4-epoxy-6-methylcyclohexylmethyl-3,4-epoxycyclohexane carboxylate, 2,3-epoxycyclohexylmethyl-3,4-epoxycyclohexane carboxylate, 4-(3,4-epoxy-5-methylcyclohexyl)butyl-3,4-epoxycyclohexane carboxylate, 3,4-epoxycyclohexylethylene oxide, cyclohexylmethyl-3,4-epoxycyclohexane carboxylate, 3,4-epoxy-6-methylcyclohexylmethyl-6-methylcyclohexane carboxylate, bisepoxycyclohexyl adipate, octadecyl-2,2'-dimethyl-3,4-epoxycyclohexane carboxylate, N-butyl-2,2'-dimethyl-3,4-epoxycyclohexane carboxylate, cyclohexyl-2-methyl-3,4-epoxycyclohexane carboxylate, N-butyl-2-isopropyl-3,4-epoxy-5-isopropyl-3,4-epoxy-5-methylcyclohexane carboxylate, octadecyl-3,4-epoxycyclohexane carboxylate, 2-ethylhexyl-3,4-epoxycyclohexane carboxylate, 4,6-dimethyl-2,3-epoxycyclohexyl-3,4-epoxycyclohexane carboxylate, diethyl-4,5-epoxy-cis-1,2-cyclohexane carboxylate, di-n-butyl-3-t-butyl-4,5-epoxy-cis-1,2-cyclohexane carboxylate, 3,4-dimethyl-1,2-epoxycyclohexane, 3,5-dimethyl-1,2-epoxycyclohexane and 3-methyl-5-t-butyl-1,2-epoxycyclohexane), bisepoxydicyclopentadienyl ether, butadiene diepoxide, tetraphenylethylene epoxide, epoxidized polybutadiene, 4,5-epoxytetrahydrophthalic anhydride, 3-t-butyl-4,5-epoxytetrahydrophthalic anhydride, or a combination comprising one or more of the foregoing.

The quenched composition can be essentially free of chlorine and bromine. "Essentially free of chlorine and bromine" is defined as having a bromine and/or chlorine content of less than or equal to 100 ppm, less than or equal to 75 ppm, or less than or equal to 50 ppm, based on the total parts by weight of the composition, excluding any filler.

The quenched composition can have a melt volume rate (MVR) of 0.5 to 80 cubic centimeters per 10 minutes (cc/10 min) measured at 300° C. under a load of 1.2 kg according to ASTM D1238-04 or ISO 1133. The quenched composition can have an MVR of 2 g/10 min to 250 g/10 min, specifically, 23.5 to 28.5 g/10 min at 300° C./1.2 kg according to ASTM D1238-04 or ISO 1133.

The quenched composition can have a light transparency of greater than 90% as determined using 3.2 mm thick samples using ASTM D1003-00, Procedure B using CIE standard illuminant C, with unidirectional viewing. Accordingly, when the quenched composition has such a light transparency, it is herein referred to as an "optical grade" composition. The optical grade composition can have a weight average molecular weight of 13,000 to 18,000 g/mol, specifically, 13,500 to 17,000 g/mol, more specifically, 14,000 to 16,000 g/mol, measured by gel permeation chromatography (GPC) calibrated on polycarbonate standards. The optical grade composition can have a Fries level of less than or equal to 500 ppm, specifically less than or equal to 400 ppm, based upon the total weight of the polycarbonate. The optical grade composition can have terminal hydroxyl groups in an amount of less than or equal to 20 mol %, specifically, less than or equal to 15 mol %, more specifically, less than or equal to 10 mol % based on the molar total of all terminal groups of the polycarbonate. The optical grade composition can have a melt flow rate (MFR) of greater than or equal to 10 g/10 min measured at 300° C. under a load of 1.2 kg according to ASTM D1238-04 or ISO 1133. The optical grade composition can have an MVR of greater than or equal to 45 cc/10 min, specifically, 45 to 80 cc/10 min, more specifically, 50 to 70 cc/10 min measured at 300° C. under a load of 1.2 kg according to ASTM D1238-04 or ISO 1133. The optical grade composition can comprise a low molecular weight polycarbonate having a weight average molecular weight of 1,000 g/mol based on polystyrene standards. The optical grade composition can comprise a total wt % of 0.5 to 1.5 wt % of the low molecular weight polycarbonate, a release agent, and optionally an antioxidant and/or a heat stabilizer based on the total weight of the composition.

As used herein, when referring to "reactive" or a "reactive group", e.g., having a reactive OH⁻ group or a reactive ester group, the reactivity is with respect to polycarbonate.

As used herein, when referring to polymerization units in the first and second stages, the number after the dash refers to the stage the polymerization unit is in and the number before the dash refers to the location of the polymerization within the stage. For example, a first-second stage polymerization unit is the first polymerization unit of the second stage polymerization units.

The present disclosure is further described in the below embodiments.

Embodiment 1

A melt polymerization process comprising: melt polymerizing reactants in at least two polymerization units, in the presence of a catalyst composition to form polymerized polycarbonate, wherein the catalyst composition comprises an alpha catalyst; adding a quencher composition comprising one or both of a liquid quencher composition and a solid quencher composition by a method comprising one or both of combining a liquid carrier and the quencher in a quencher vessel to form the liquid quencher composition or melting the quencher in the quencher vessel to form the liquid quencher composition, and adding the liquid quencher composition to the polymerized polycarbonate at a pressure of greater than or equal to 2 bars or greater than or equal to 3 bars; and adding the solid quencher composition comprising the quencher to the polymerized polycarbonate in an extruder; mixing the quencher composition with the polymerized polycarbonate for a period of time of greater than or equal to 5 seconds prior to the addition to the polymerized polycarbonate of any additives having a reactive OH group or reactive ester group; filtering the polymerized polycarbonate; directing the polymerized polycarbonate to an extruder; directing an anthraquinone colorant, a phenolic antioxidant, a UV absorber, a release agent, a flame retardant, or a combination comprising one or more of the foregoing to the extruder; and adding an anti-drip agent.

Embodiment 2

The process of any one of the preceding embodiments, wherein the adding the quencher composition comprises adding the liquid quencher composition.

Embodiment 3

The process of any one of the preceding embodiments, wherein the liquid carrier comprises diarylcarbonate, phenol, bisphenol A, polycarbonate oligomers, bisphenol A derivatives, propylene carbonate, xylene, toluene, benzene, ethylbenzene, anisole, chlorobenzene, water, acetone, or a combination comprising one or more of the foregoing.

Embodiment 4

The process of any one of the preceding embodiments, wherein the liquid carrier is free of water.

Embodiment 5

The process of any one of the preceding embodiments, further comprising adding a second catalyst composition that comprises TPPA.

Embodiment 6

The process of any one of the preceding embodiments, wherein the quencher composition comprises 1 to 10 ppm alkyl tosylate, based upon 100 parts of the polymerized polycarbonate.

Embodiment 7

The process of any one of the preceding embodiments, wherein the adding the quencher composition comprises adding the solid quencher composition.

Embodiment 8

The process of any one of the preceding embodiments, further comprising pelletizing the polymerized polycarbonate prior to directing the polymerized polycarbonate to the extruder.

Embodiment 9

The process of any one of the preceding embodiments, further comprising melting the polymerized polycarbonate prior to adding the solid quencher composition.

Embodiment 10

The process of any one of the preceding embodiments, wherein the solid quencher composition comprises a polycarbonate powder.

Embodiment 11

The process of any one of Embodiments 1-9, wherein the quencher composition is free of the liquid carrier and a solid carrier.

Embodiment 12

The process of any one of the preceding embodiments, wherein the quencher composition comprises 1 to 10 ppm of a sulfonic acid ester, based upon 100 parts of the polymerized polycarbonate; and/or 1 to 10 ppm phosphorous acid, based upon 100 parts of the polymerized polycarbonate.

Embodiment 13

The process of any one of the preceding embodiments, wherein the quencher composition comprises 1 to 10 ppm phosphorous acid, based upon 100 parts of the polymerized polycarbonate.

Embodiment 14

The process of any one of the preceding embodiments, wherein the quencher comprises a phosphorous acid compound, and wherein the phosphorous acid compound comprises a phosphorous acid monoester, a phosphorous acid diester, a phosphorous acid triester, a phosphinic ester, an organic phosphonite; a phosphoric ester, a phosphonic ester, or a combination comprising one or more of the foregoing.

Embodiment 15

The process of any one of the preceding embodiments, wherein the quencher comprises a phosphorous acid compound comprises phenyl phosphonic acid, phenyl dihydrogen phosphite, nonylphenyl dihydrogen phosphite, 2,4-di-t-butylphenyl dihydrogen phosphite, diphenyl hydrogen phosphite, bis(nonylphenyl) hydrogen phosphite, bis(2,4-di-t-butylphenyl) hydrogen phosphite, dicresyl hydrogen phosphite, bis (p-t-butylphenyl) hydrogen phosphite, bis(p-hexylphenyl) hydrogen phosphite, tetrakis (2,4)-di-t-butylphenyl 4,4'-biphenylene diphosphinate, tris(2,4-di-t-butylphenyl) phosphite, tris(nonylphenyl) phosphite, tris(dinonylphenyl) phosphite, triphenyl phosphite, tetraphenyl dipropylene glycol diphosphite, tetra(tridecyl) 4,4'-isopropylidene diphenyl diphosphite, bis(tridecyl)pentaerythritol diphosphite, bis(nonylphenyl pentaerythritol)diphosphite, bis(2,4-di-t-butylphenyl) pentaerythritol diphosphite, bis(2,6-di-t-butyl-4-methylphenyl)pentaerythritol diphosphite, distearyl pentaerythritol diphosphite, hydrogenated bisphenol A pentaerythritol phosphite polymer, tetraphenyl tetra(tridecyl)pentaerythritol tetraphosphite, tetrakis-(2,4-di-t- butylphenyl) 4,4'-biphenylene diphosphonite, or a combination comprising one or more of the foregoing.

Embodiment 16

The process of any one of Embodiments 1-11, wherein the quencher is free of a phosphorous acid quencher.

Embodiment 17

The process of any one of the preceding embodiments, wherein the quencher composition comprises n-butyl tosylate.

Embodiment 18

The process of any one of the preceding embodiments, wherein the colorant is present in an amount of 0.00001 to 0.0002 parts by weight based on the total weight of the polymerized polycarbonate.

Embodiment 19

The process of any one of the preceding embodiments, wherein the phenolic antioxidant comprises 2,6-di-t-butyl-p-cresol, 2,6-di-t-butyl-p-anisole, 2,6-di-t-butyl-4-ethylphenol, 2,2'-methylenebis(6-t-butyl-p-cresol), 2,2'-methylenebis-(4-ethyl-6-t-butylphenol), 4,4'-methylenebis(6-t-butyl-o-cresol), 4,4'-butylidenebis(6-t-butyl-m-cresol), tetrakis-[methylene-3-(3',5'-di-t-butyl-4'-hydroxyphenyl) propionate]methane, 4,4'-thiobis(6-t-butyl-m-cresol), stearyl-β-(3,5-di-t-butyl-4-hydroxyphenyl) propionate, 1,3,5-trimethyl-2,4,6-tris(3,5-di-t-butyl-4-hydroxybenzyl)benzene, 1,1,3-tris(2-methyl-4-hydroxy-5-t-butylphenyl)butane, triethylene glycol-bis[3-(3-t-butyl-5-methyl-4-hydroxyphenyl)propionate], tetrakis-[methylene-3-(3',5'-di-t-butyl-4'-hydroxyphenyl)propionate]methane, stearyl-β-(3,5-di-t-butyl-4-hydroxyphenyl) propionate, and triethylene glycol-bis[3-(3-t-butyl-5-methyl-4-hydroxyphenyl) propionate, 3,5-di-t-butyl-4-hydroxybenzylphosphonate-diethyl ester, and bis(ethyl-3,5-di-t-butyl-4-hydroxybenzylphosphonate)calcium, or a combination comprising one or more of the foregoing.

Embodiment 20

The process of any one of the preceding embodiments, wherein the UV absorber comprises 2-(5-methyl-2-hydroxyphenyl)-2H-benzotriazole, 2-[2-hydroxy-3,5-bis(alpha, alpha dimethylbenzyl)phenyl]-2H-benzotriazole, 2-(2'-hydroxy-5'-t-octylphenyl) benzotriazole, 2,2-methylene bis [4-(1,1,3,3-tetramethylene butyl)-6-(2H-benzotriazole-2-yl) phenol], 2-hydroxy-4-octoxybenzophenone, 2,4-dihydroxybenzophenone, 2-hydroxy-4-methoxy-4'-chloro benzophenone, 2,2-dihydroxy-4-methoxybenzophenone, 2,2-dihydroxy-4,4'-dimethoxybenzophenone, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxy phenyl)-1,3,5-triazine, 2,4-diphenyl-6-(2-hydroxy-4-octyloxy phenyl)-1,3,5-triazine, 2,4-diphenyl-6-(2-hydroxy-4-dodecyloxy phenyl)-1,3,5-triazine, 2,4-diphenyl-6-(2-hydroxy-4-benzyloxyphenyl)-1,3,5-triazine, 2,4-diphenyl-6-(2-hydroxy-4-(2-butoxyethoxy) phenyl)-1,3,5-triazine, 2,4-di-p-toluyl-6-(2-hydroxy-4-methoxyphenyl)-1,3,5-triazine, 2,4-di-p-toluyl-6-(2-hydroxy-4-ethoxyphenyl)-1,3,5-triazine, 2,4-di-p-toluyl-6-(2-hydroxy-4-propoxyphenyl)-1,3,5-triazine, 2,4-di-p-toluyl-6-(2-hydroxy-4-butoxyphenyl)-1,3,5-triazine, 2,4-p-toluyl-6-(2-hydroxy-4-hexyloxy phenyl)-1,3,5-triazine, 2,4-di-p-toluyl-6-(2-hydroxy-4-octyloxy phenyl)-1,3,5-triazine, 2,4-di-p-toluyl-6-(2-hydroxy-4-dodecyloxy phenyl)-1,3,5-triazine, 2-(4,6-diphenyl-1,3,5-triazine-2-yl)-5-(hexyl) oxyphenol, 2,4-di-p-toluyl-6-(2-hydroxy-4-benzyloxyphenyl)-1,3,5-triazine, 2,4-di-p-toluyl-6-(2-hydroxy-4-(2-hexyloxy ethoxy) phenyl)-1,3,5-triazine, t-butylphenyl salicylate, octylphenylsalicylate, or a combination comprising one or more of the foregoing.

Embodiment 21

The process of any one of the preceding embodiments, wherein the release agent comprises a polyhydric alcohol, a $C_{10\text{-}30}$ saturated fatty acid, a partial ester, a full ester, or a combination comprising one or more of the foregoing, specifically, the release agent comprises glycerol tristearate.

Embodiment 22

The process of any one of the preceding embodiments, wherein the flame retardant comprises a flame retardant of the formula (200), wherein each $R^L$ independently is an alkyl group, a cycloalkyl group, or an aryl group; $R^M$ is an alkyl group or a cycloalkyl group; iv is an integer; and each vi independently is 0 or 1.

Embodiment 23

The process of any one of the preceding embodiments, further comprising extruding polycarbonate pellets from the extruder; coating the polycarbonate pellets with a PTFE coating layer, wherein the coating layer has a coating thickness of 0.5 to 15 micrometers to form coated polycarbonate pellets; and melt mixing or extruding the coated polycarbonate pellets.

Embodiment 24

The process of any one of the preceding embodiments, wherein the reactants comprise a diaryl carbonate and a dihydroxy compound.

Embodiment 25

The process of Embodiment 24, wherein one or both of the diaryl carbonate and the dihydroxy compound each independently comprised a metal compound, wherein the metal compound comprises less than or equal to 500 ppb of molybdenum; less than or equal to 33 ppb of vanadium; less than or equal to 33 ppb of chromium; less than or equal to 75 ppb of titanium; less than or equal to 375 ppb of niobium; less than or equal to 33 ppb of nickel; less than or equal to 10 ppb of zirconium; and less or equal to 10 ppb iron; all based on the total weight of the metal compound and the respective diaryl carbonate and dihydroxy compound.

Embodiment 26

The process of any one of the preceding embodiments, wherein the catalyst composition comprises a quaternary compound; wherein the quaternary compound comprises one or both of a quaternary ammonium compound and a quaternary phosphonium compound.

Embodiment 27

The process of Embodiment 26, wherein the quaternary compound comprises a second metal, wherein the second metal comprises at least one of sodium, potassium, cesium; wherein if the second metal compound comprises sodium sulfate, the amount of sodium is 0 to 1,690 ppm; if the second metal compound comprises cesium sulfate, the amount of cesium is 0 to 275 ppm; if the second metal compound comprises sodium hydroxide, the amount of sodium is 0 to 35 ppm; if the second metal compound comprises potassium hydroxide, the amount of potassium is 0 to 50 ppm; if the second metal compound comprises cesium hydroxide, the amount of cesium is 0 to 140 ppm all based on the weight of the quaternary compound.

Embodiment 28

The process of any one of Embodiments 26-27, wherein the quaternary compound comprises one or both of TPPA and TPPP.

Embodiment 29

The process of any one of Embodiments 26-28, wherein the melt polymerizing comprises forming a catalyst mixture in a mixing unit, wherein the catalyst mixture comprises a dihydroxy compound, a carbonate compound, and the quaternary compound.

Embodiment 30

The process of Embodiment 29, further comprising adding the dihydroxy compound to the mixing unit, adding the carbonate compound to the mixing unit, reducing a water and/or an alkyl alcohol level to a reduced level of less than or equal to 450 ppm based on the total weight of the carbonate compound and/or less than or equal to 400 ppm based on the total weight of the dihydroxy compound; and adding the quaternary compound, for example, wherein the monomer stage catalyst is added after reducing the water and/or the alkyl alcohol level to the reduced level.

Embodiment 31

The process of any of Embodiments 29-30, wherein the carbonate compound comprises less than or equal to 450 ppm of water and/or an alkyl alcohol based on the total weight of the carbonate compound; and/or the dihydroxy compound comprises less than or equal to 400 ppm of water and/or an alkyl alcohol based on the total weight of the dihydroxy compound prior to adding.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Disclosure of a narrower range or more specific group in addition to a broader range is not a disclaimer of the broader range or larger group.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

This application claims priority to European Patent application No. 14382110.6 filed Mar. 27, 2014 and European Patent application No. 14382110.6 filed Mar. 27, 2014.

I claim:
1. A melt polymerization process comprising:
    melt polymerizing reactants in at least two polymerization units, in the presence of a catalyst composition to form polymerized polycarbonate, wherein the catalyst composition comprises a catalyst comprising a source of one or both of alkali and alkaline earth metal ions;
    adding a liquid quencher composition by a method comprising
    combining a liquid carrier and a quencher in a quencher vessel to form the liquid quencher composition and adding the liquid quencher composition to the polymerized polycarbonate at a pressure of greater than or equal to 2 bars; wherein the liquid carrier is free of water and phenol;
    mixing the quencher composition with the polymerized polycarbonate for a period of time of greater than or equal to 5 seconds prior to the addition to the polymerized polycarbonate of any additives having a reactive OH group or reactive ester group;
    filtering the polymerized polycarbonate;
    directing the polymerized polycarbonate to an extruder;
    directing an anthraquinone colorant, a phenolic antioxidant, a UV absorber, a release agent, a flame retardant, or a combination comprising one or more of the foregoing to the extruder; and
    adding an anti-drip agent.
2. The process of claim 1, wherein the liquid carrier comprises diarylcarbonate, bisphenol A, polycarbonate oligomers, bisphenol A derivatives, propylene carbonate, xylene, toluene, benzene, ethylbenzene, anisole, chlorobenzene, acetone, or a combination comprising one or more of the foregoing.

3. The process of claim 1, further comprising pelletizing the polymerized polycarbonate prior to directing the polymerized polycarbonate to the extruder.

4. The process of claim 1, further comprising adding a solid quencher composition.

5. The process of claim 1, wherein the quencher composition comprises 1 to 10 ppm alkyl tosylate, based upon 100 parts of the polymerized polycarbonate and/or 1 to 10 ppm of a sulfonic acid ester, based upon 100 parts of the polymerized polycarbonate; and/or 1 to 10 ppm phosphorous acid, based upon 100 parts of the polymerized polycarbonate.

6. The process of claim 1, wherein the quencher comprises a phosphorous acid compound, and wherein the phosphorous acid compound comprises a phosphorous acid monoester, a phosphorous acid diester, a phosphorous acid triester, a phosphinic ester, an organic phosphonite; a phosphoric ester, a phosphonic ester, or a combination comprising one or more of the foregoing.

7. The process of claim 1, wherein the quencher is free of a phosphorous acid quencher.

8. The process of claim 1, wherein the phenolic antioxidant comprises 2,6-di-t-butyl-p-cresol, 2,6-di-t-butyl-p-anisole, 2,6-di-t-butyl-4-ethyl phenol, 2,2'-methylenebis(6-t-butyl-p-cresol), 2,2'-methylenebis-(4-ethyl-6-t-butyl phenol), 4,4'-methylenebis(6-t-butyl-o-cresol), 4,4'-butylidenebis(6-t-butyl-m-cresol), tetrakis-[methylene-3-(3',5'-di-t-butyl-4'-hydroxyphenyl)propionate]methane, 4,4'-thiobis(6-t-butyl-m-cresol), stearyl-β-(3,5-di-t-butyl-4-hydroxyphenyl) propionate, 1,3,5-trimethyl-2,4,6-tris (3,5-di-t-butyl-4-hydroxybenzyl)benzene, 1,1,3-tris(2-methyl-4-hydroxy-5-t-butylphenyl) butane, triethylene glycol-bis[3-(3-t-butyl-5-methyl-4-hydroxyphenyl)propionate], tetrakis-[methylene-3-(3',5'-di-t-butyl-4'-hydroxyphenyl) propionate]methane, stearyl-β-(3,5-di-t-butyl-4-hydroxyphenyl) propionate, and triethylene glycol-bis[3-(3-t-butyl-5-methyl-4-hydroxyphenyl) propionate, 3,5-di-t-butyl-4-hydroxybenzylphosphonate-diethyl ester, and bis (ethyl-3,5-di-t-butyl-4-hydroxybenzylphosphonate)calcium, or a combination comprising one or more of the foregoing.

9. The process of claim 1, wherein the UV absorber comprises 2-(5-methyl-2-hydroxyphenyl)-2H-benzotriazole, 2-[2-hydroxy-3,5-bis(alpha, alpha dimethylbenzyl)phenyl]-2H-benzotriazole, 2-(2'-hydroxy-5'-t-octylphenyl) benzotriazole, 2,2-methylene bis [4-(1,1,3,3-tetramethylene butyl)-6-(2H-benzotriazole-2-yl) phenol], 2-hydroxy-4-octoxybenzophenone, 2,4-dihydroxybenzophenone, 2-hydroxy-4-methoxy-4'-chloro benzophenone, 2,2-dihydroxy-4-methoxybenzophenone, 2,2-dihydroxy-4,4'-dimethoxybenzophenone, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxy phenyl)-1,3,5-triazine, 2,4-diphenyl-6-(2-hydroxy-4-octyloxy phenyl)-1,3,5-triazine, 2,4-diphenyl-6-(2-hydroxy-4-dodecyloxy phenyl)-1,3,5-triazine, 2,4-diphenyl-6-(2-hydroxy-4-benzyloxyphenyl)-1,3,5-triazine, 2,4-diphenyl-6-(2-hydroxy-4-(2-butoxyethoxy) phenyl)-1,3,5-triazine, 2,4-di-p-toluyl-6-(2-hydroxy-4-methoxypheny)-1,3,5-triazine, 2,4-di-p-toluyl-6-(2-hydroxy-4-ethoxyphenyl)-1,3,5-triazine, 2,4-di-p-toluyl-6-(2-hydroxy-4-propoxyphenyl)-1,3,5-triazine, 2,4-di-p-toluyl-6-(2-hydroxy-4-butoxyphenyl)-1,3,5-triazine, 2,4-di-p-toluyl-6-(2-hydroxy-4-hexyloxy phenyl)-1,3,5-triazine, 2,4-di-p-toluyl-6-(2-hydroxy-4-octyloxy phenyl)-1,3,5-triazine, 2,4-di-p-toluyl-6-(2-hydroxy-4-dodecyloxy phenyl)-1,3,5-triazine, 2-(4,6-diphenyl-1,3,5-triazine-2-yl)-5-(hexyl) oxyphenol, 2,4-di-p-toluyl-6-(2-hydroxy-4-benzyloxyphenyl)-1,3,5-triazine, 2,4-di-p-toluyl-6-(2-hydroxy-4-(2-hexyloxy ethoxy) phenyl)-1,3,5-triazine, t-buthylphenyl salicylate, octylphenylsalicylate, or a combination comprising one or more of the foregoing.

10. The process of claim 1, wherein the release agent comprises a polyhydric alcohol, a $C_{10-30}$ saturated fatty acid, a partial ester, a full ester, or a combination comprising one or more of the foregoing.

11. The process of claim 1, wherein the flame retardant comprises a flame retardant of the formula (200)

$$R^L{\text{--}}(O)_{vi}{\text{--}}\underset{\underset{R^L}{(O)_{vi}}}{\overset{O}{\overset{\|}{P}}}{\text{--}}(O{\text{--}}R^M{\text{--}}O){\text{--}}\underset{\underset{R^L}{(O)_{vi}}}{\overset{O}{\overset{\|}{P}}}{\text{--}}(O)_{vi}{\text{--}}R^L \quad (200)$$

wherein each $R^L$ independently is an alkyl group, a cycloalkyl group, or an aryl group; $R^M$ is an alkyl group or a cycloalkyl group; iv is an integer; and each vi independently is 0 or 1.

12. The process of claim 1, further comprising
extruding polycarbonate pellets from the extruder;
coating the polycarbonate pellets with a PTFE coating layer, wherein the coating layer has a coating thickness of 0.5 to 15 micrometers to form coated polycarbonate pellets; and
melt mixing or extruding the coated polycarbonate pellets.

13. The process of claim 1, wherein the pressure is greater than or equal to 3 bars.

14. The process of claim 1, wherein the colorant is present in an amount of 0.00001 to 0.0002 parts by weight based on the total weight of the polymerized polycarbonate.

15. The process of claim 1, wherein the melt polymerizing comprises forming a catalyst mixture in a mixing unit by adding a dihydroxy compound to the mixing unit, adding a carbonate compound to the mixing unit, reducing a water and an alkyl alcohol level to a reduced level of less than or equal to 450 ppm based on the total weight of the carbonate compound and/or less than or equal to 400 ppm based on the total weight of the dihydroxy compound; and adding a quaternary compound.

16. The process of claim 1, wherein the catalyst composition comprises tetraphenyl phosphonium phenoxide.

17. The process of claim 1, wherein the liquid carrier comprises a low boiling point solvent and a high boiling point solvent; wherein the low boiling point solvent has a low boiling point that is lower than a boiling point of the quencher and the high boiling point solvent has a high boiling point that is greater than a boiling point of the quencher.

* * * * *